US011131095B2

(12) United States Patent
Beiler et al.

(10) Patent No.: US 11,131,095 B2
(45) Date of Patent: Sep. 28, 2021

(54) ROOF WASTE REMOVAL ASSEMBLY

(71) Applicant: New Heights, LLC, Leola, PA (US)

(72) Inventors: Aaron Jay Beiler, Gap, PA (US); Raymond Beiler, New Holland, PA (US); Jeremiah Weaver, Narvon, PA (US)

(73) Assignee: New Heights, LLC, Leola, PA (US)

( * ) Notice: Subject to any disclaimer, the term of this patent is extended or adjusted under 35 U.S.C. 154(b) by 72 days.

(21) Appl. No.: 16/596,869

(22) Filed: Oct. 9, 2019

(65) Prior Publication Data
US 2021/0108420 A1    Apr. 15, 2021

(51) Int. Cl.
*E04D 15/00* (2006.01)
*B60P 1/44* (2006.01)
*B65G 11/14* (2006.01)
*B65G 11/02* (2006.01)

(52) U.S. Cl.
CPC .......... *E04D 15/003* (2013.01); *B60P 1/4414* (2013.01); *B65G 11/14* (2013.01); *B65G 11/146* (2013.01); *B65G 11/02* (2013.01)

(58) Field of Classification Search
CPC ...... B65G 67/06; B65G 67/24; E04D 15/003; B60P 1/44; B60P 1/4414; B60P 1/4421; B60P 1/4485
USPC .................................................. 414/397, 399
See application file for complete search history.

(56) References Cited

U.S. PATENT DOCUMENTS

| 3,666,127 | A  | * | 5/1972  | Guyaux       | B65G 69/24  |
|-----------|----|---|---------|--------------|-------------|
|           |    |   |         |              | 414/495     |
| 4,312,619 | A  | * | 1/1982  | Anderson     | B65G 67/20  |
|           |    |   |         |              | 414/347     |
| 5,098,165 | A  | * | 3/1992  | Jacobs       | B66B 9/16   |
|           |    |   |         |              | 156/763     |
| 6,547,509 | B1 | * | 4/2003  | Edmo         | B66F 7/0641 |
|           |    |   |         |              | 187/269     |
| 6,817,677 | B1 | * | 11/2004 | Beiler       | B60P 1/34   |
|           |    |   |         |              | 298/21 R    |
| 7,802,854 | B1 | * | 9/2010  | Lane         | E04D 15/02  |
|           |    |   |         |              | 299/37.1    |
| 10,017,091 | B2 | * | 7/2018  | Beiler      | B60P 1/04   |
| 10,214,911 | B2 | * | 2/2019  | Ragula      | E04D 15/02  |
| 10,464,463 | B2 | * | 11/2019 | Beiler      | B62D 51/04  |
| 10,632,891 | B2 | * | 4/2020  | Derstine    | B66F 7/00   |
| 10,696,504 | B2 | * | 6/2020  | Clark       | B60P 1/025  |
| 2007/0164597 | A1 | * | 7/2007 | Brown       | E04D 15/003 |
|           |    |   |         |              | 299/39.1    |
| 2012/0042603 | A1 | * | 2/2012 | Cross       | E04D 15/003 |
|           |    |   |         |              | 52/741.1    |
| 2016/0167558 | A1 | * | 6/2016 | Beiler      | B60P 1/34   |
|           |    |   |         |              | 414/483     |
| 2016/0312473 | A1 | * | 10/2016 | Ashton-Miller | B08B 5/02 |
| 2016/0312482 | A1 | * | 10/2016 | Robinson   | B65G 67/20  |
| 2017/0191272 | A1 | * | 7/2017  | Ashton-Miller | B08B 1/005 |
| 2018/0043811 | A1 | * | 2/2018  | Beiler      | B60P 1/34   |
| 2019/0368199 | A1 | * | 12/2019 | Gori        | G01B 3/14   |
| 2020/0114993 | A1 | * | 4/2020  | Beiler      | B60P 1/02   |

(Continued)

*Primary Examiner* — Joseph A Dillon, Jr.
(74) *Attorney, Agent, or Firm* — Barley Snyder

(57) ABSTRACT

A roof waste removal assembly is provided and includes a chute system and a self-propelled expanding trailer. The chute system includes a roof guide and a gutter shield. The self-propelled expanding trailer includes a frame, an extension device secured to the frame, and a storage bin secured to the extension device.

34 Claims, 19 Drawing Sheets

(56) References Cited

U.S. PATENT DOCUMENTS

| | | | | |
|---|---|---|---|---|
| 2021/0001718 A1* | 1/2021 | Beiler | .................... | F16D 11/14 |
| 2021/0001937 A1* | 1/2021 | Beiler | ................... | B66F 9/0655 |
| 2021/0001938 A1* | 1/2021 | Beiler | ....................... | B60P 1/44 |
| 2021/0001939 A1* | 1/2021 | Beiler | .................... | B62D 59/04 |

* cited by examiner

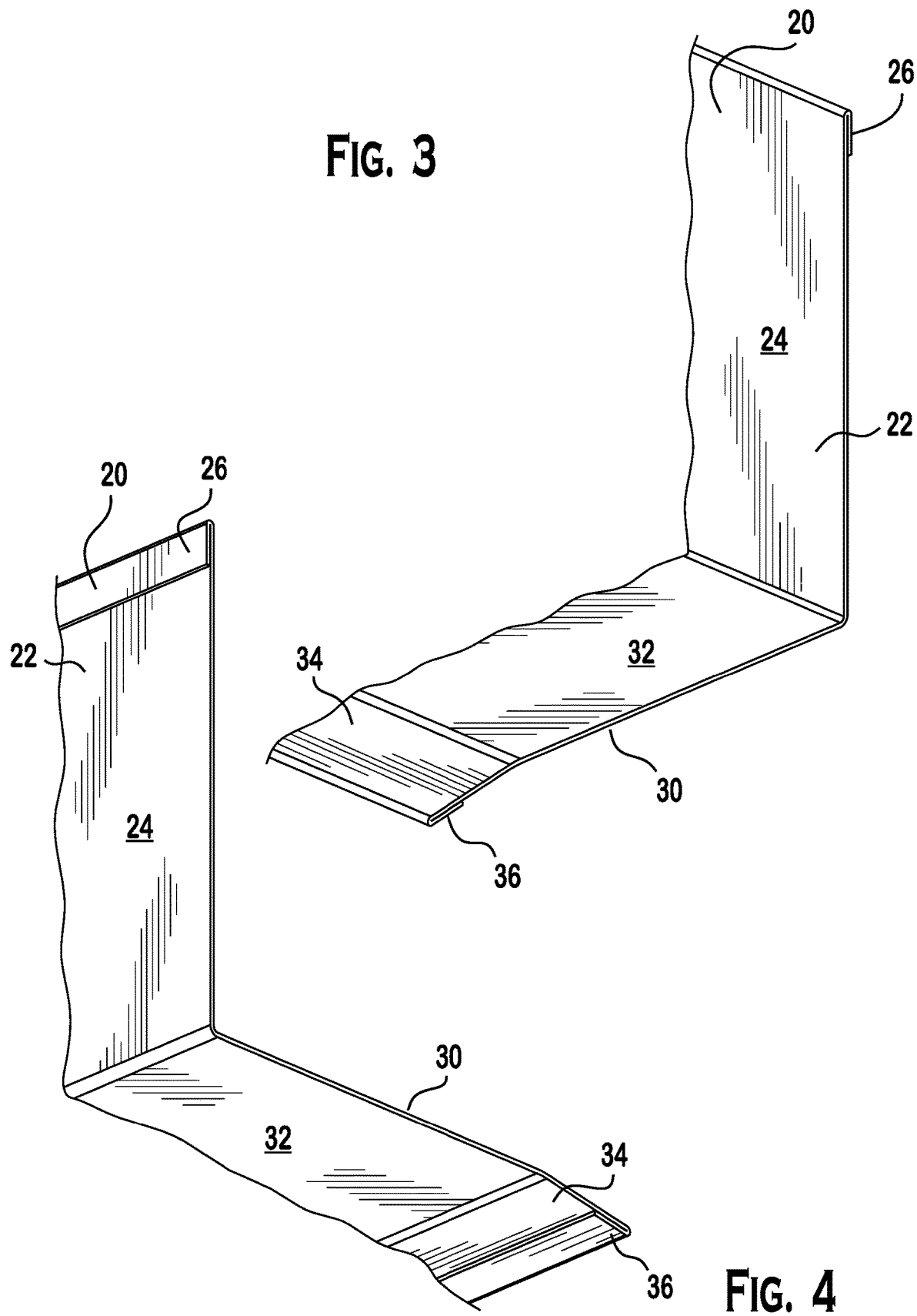

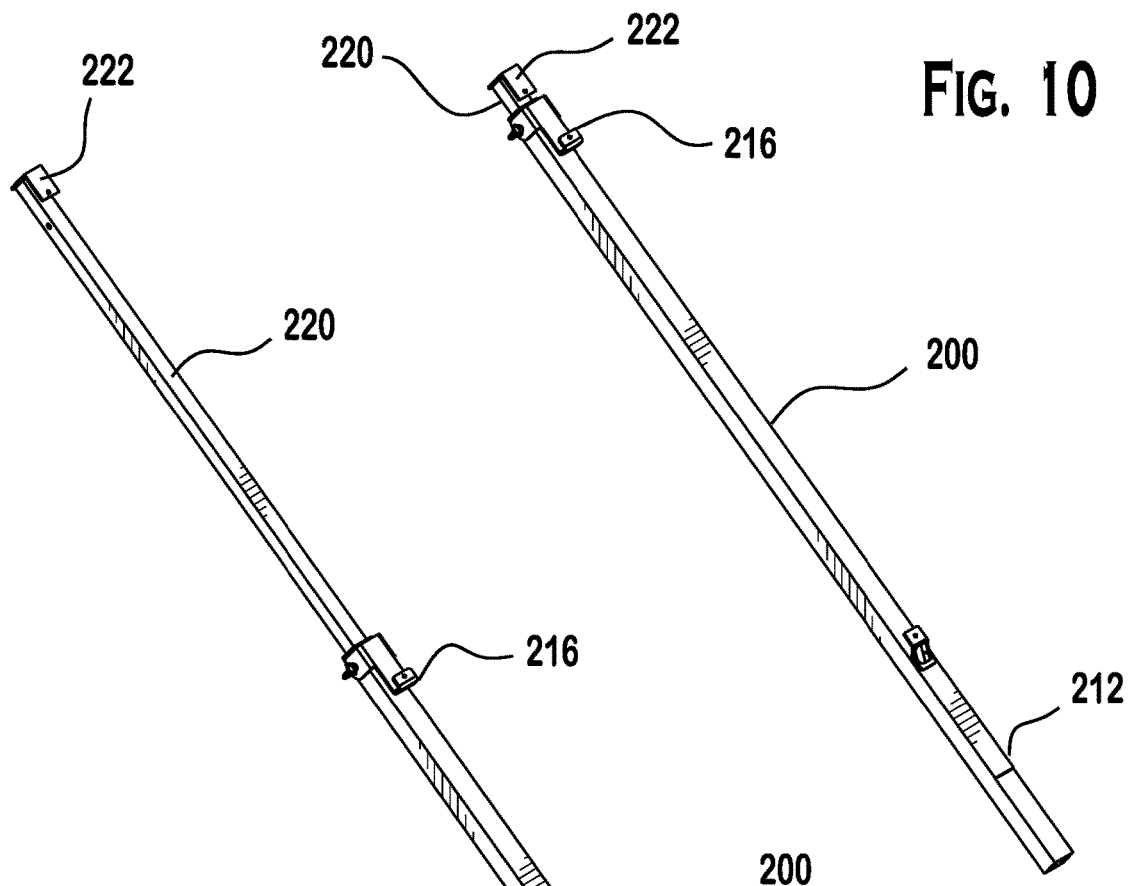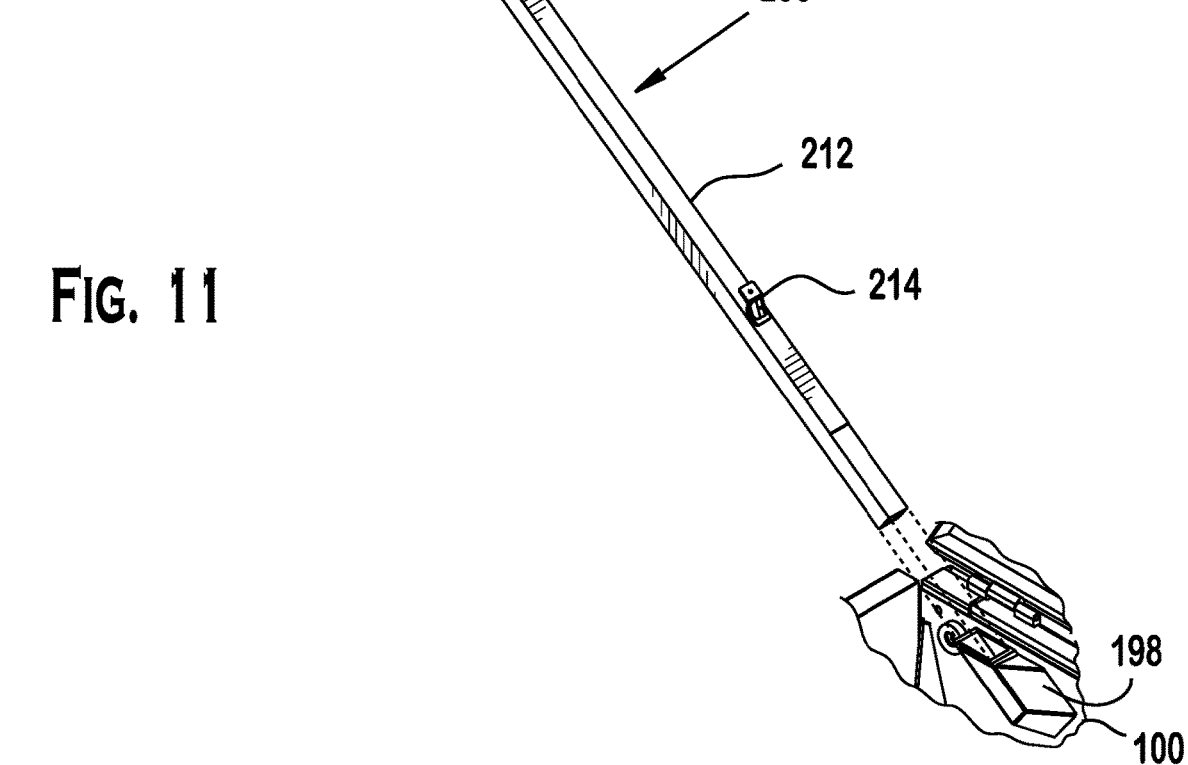

ROOF WASTE REMOVAL ASSEMBLY

FIELD OF THE INVENTION

The invention relates to a roof waste removal assembly, and more particularly, to a roof waste removal assembly for removing wastes on roof tops.

BACKGROUND

Workers often find that providing materials for replacement of a building roof is very time consuming, considering the task involves using different mechanical units or manual labor to lift building materials from a truck and position them on a roof. Furthermore, stripping old material from the building roof in order to put on a new roof is also time consuming and a dirty job. Generally, old material is thrown from the roof to the ground around the building and then workers manually pick up debris to deposit it into a disposal container. Even if the material can be thrown directly into a container there remain the problems of getting the disposal container in proximity to the roof and removal from the work site. The most common solution to the disposal problem is to move a dump truck adjacent to the building and to attempt to throw the material directly from the roof into the truck bin. Furthermore, the problem is not limited to roofing material. Any building remodeling generates significant construction trash, and the most convenient method of removing it from the building is to throw it out a window.

As a result, it is not always possible to move a large truck into a location adjacent to a building. Fences, lawns, and shrubs can be damaged by any size truck, especially a large transport truck.

There is a need for a roof waste removal assembly to remove material from a rooftop in a streamlined and efficient manner.

SUMMARY

In view of the foregoing, a roof waste removal assembly is provided. The roof waste removal assembly includes a chute system and a self-propelled expanding trailer. The chute system includes a roof guide and a gutter shield. The self-propelled expanding trailer includes a frame, an extension device secured to the frame, and a storage bin secured to the extension device.

BRIEF DESCRIPTION OF THE DRAWINGS

The invention is explained in greater detail below with reference to embodiments and the appended drawings, of which:

FIG. 3 is a front perspective view of a roof guide for roof waste removal assembly according to the invention;

FIG. 4 is a rear perspective view of the roof guide of FIG. 3

FIG. 10 is an isolated perspective view of an extension pole of the extender of FIG. 12 showing the extension pole in a retracted position;

FIG. 11 is an isolated perspective view of an extension pole of the extender of FIG. 12 showing the extension pole in an extended position.

DETAILED DESCRIPTION OF THE EMBODIMENT(S)

The invention is explained in greater detail below with reference to embodiments of a roof waste removal assembly. This invention may, however, be embodied in many different forms and should not be construed as limited to the embodiments set forth herein; rather, these embodiments are provided so that this disclosure will be thorough and complete and still fully convey the scope of the invention to those skilled in the art.

Figure 1:
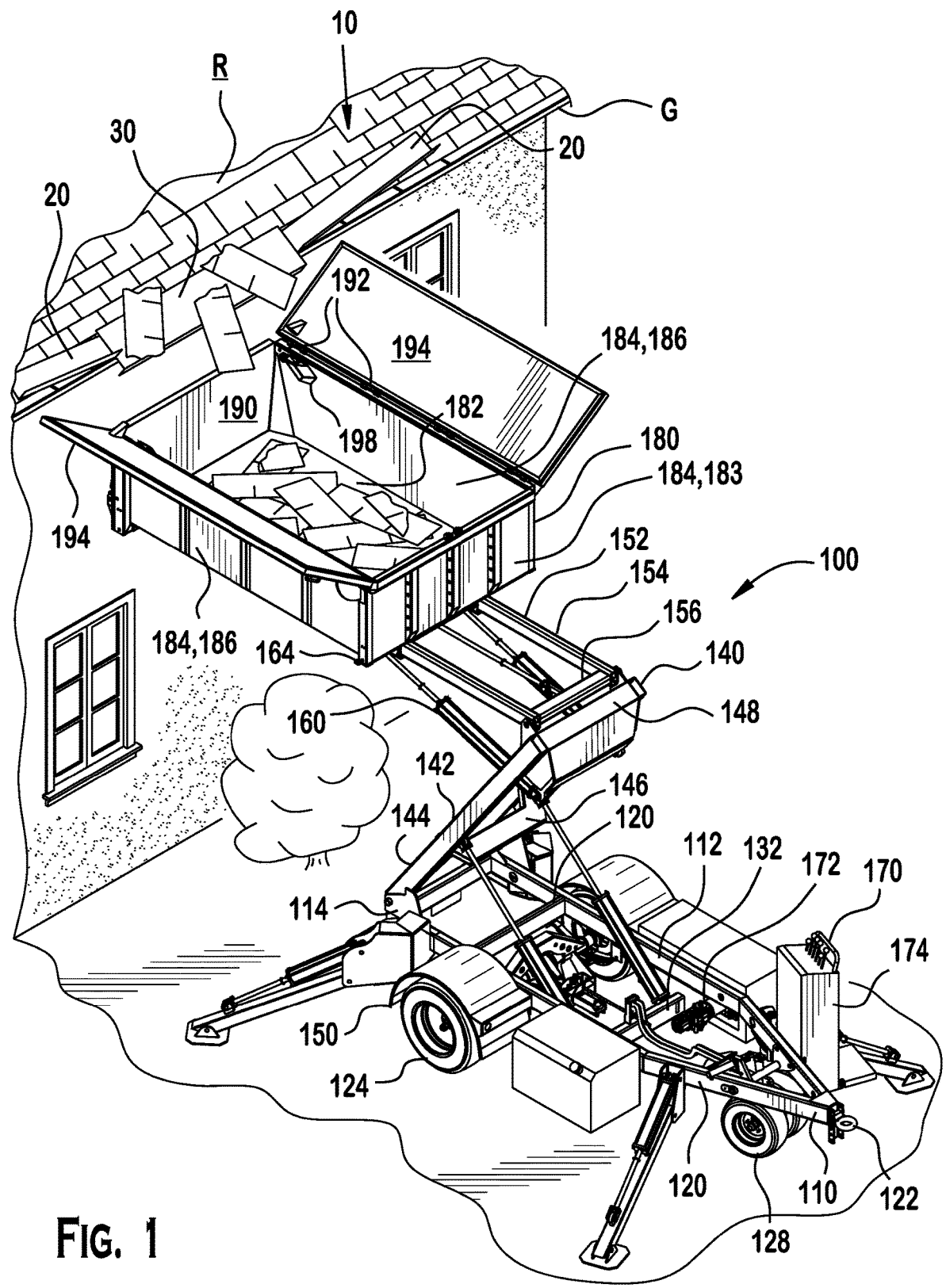
FIG. 1 is a perspective view of a roof waste removal assembly according to the invention assembled on a known roof top.

A roof waste removal assembly 1 according to the invention is shown generally in FIG. 1. The roof waste removal assembly 1 includes the following major components: a chute system 10 and an expanding trailer 100.

With reference to FIG. 1-7, an exemplary chute system 10 according to the invention will be described. The chute system 10 generally includes one or more roof guides 20 and a gutter shield 40.

Figure 5:
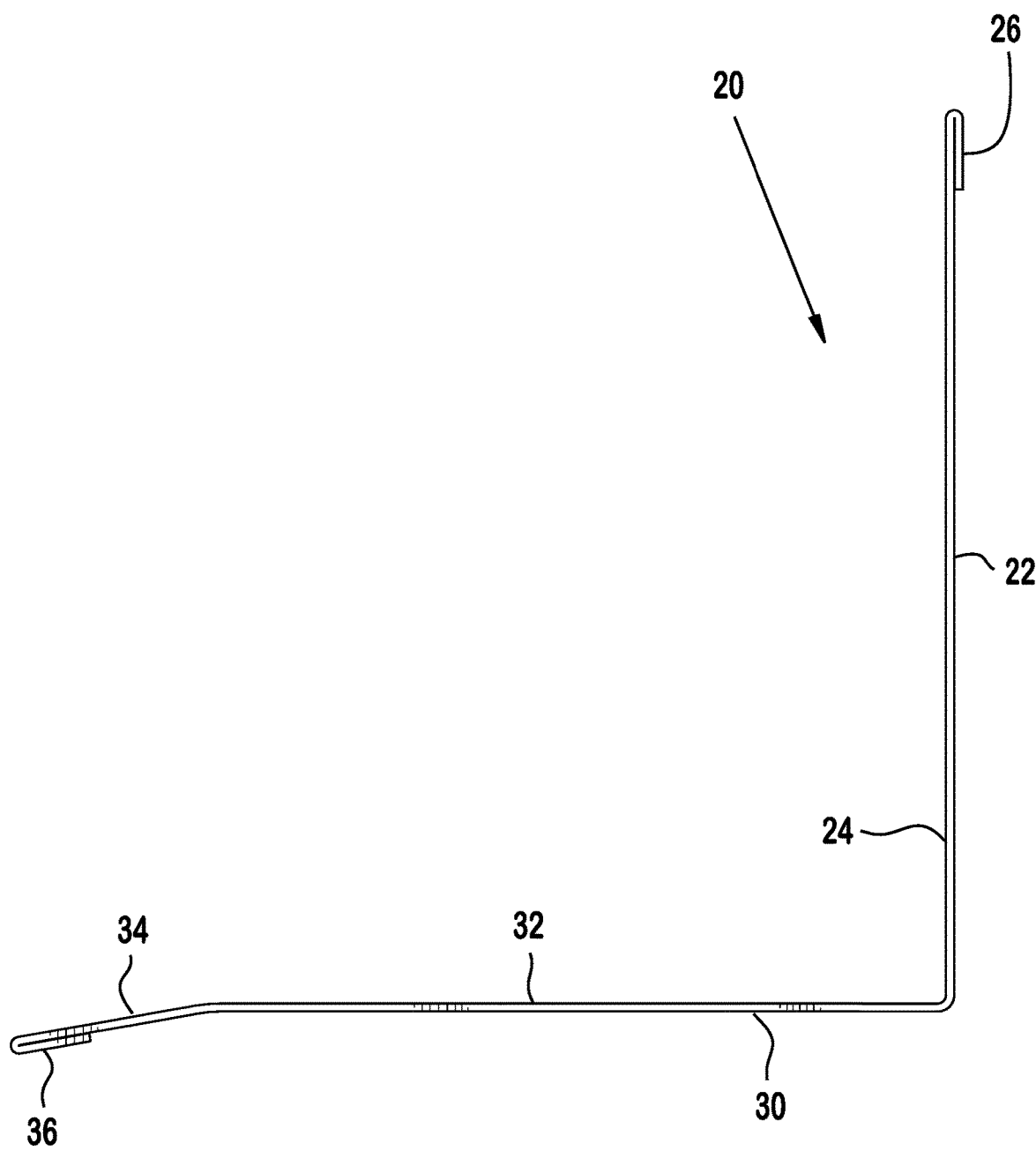
FIG. 5 is left side view of the roof guide of FIG. 3.

With respect to FIG. 3-5, an exemplary roof guide 20 is an elongated structured formed from a single piece of material, such as sheet metal. The roof guide 20 generally includes a front guide section 22 and a rear guide section 30 positioned orthogonal to the front guide section 22.

As shown in FIG. 3-5, the front guide section 22 generally includes a front wall 24 and a front lip 26. The front wall 24 is an elongated planar body having a top and bottom surface extending upward from the rear guide section 30 by a bend in the roof guide 20. As shown, the bend is a ninety (90) degree bend permitting the front guide section 22 and, more particularly, the front wall 24 to be orthogonally positioned with respect to the rear guide section 30. The front lip 26 extends from the front wall 24 and is bent about one hundred and eight (180) degrees and is positioned on a bottom planar surface of the front wall 24. In an exemplary embodiment shown, the front lip 26 extends from each side end of the front wall 24.

As shown in FIG. 3-5, the rear guide section 30 generally includes a floor 32, a guide threshold 34, and a rear lip 36. The floor 32 is an elongated planar body having a top and bottom surface extending upward from the rear guide section 30 by the bend in the roof guide 20. As shown, the bend is a ninety (90) degree bend permitting the front wall 24 to be orthogonally positioned with respect to the floor 32. The guide threshold 34 is an elongated planar body that extends from the floor 32 and is angled with respect to the bottom surface of the floor 32. More particularly, the guide threshold 34 extends away from the bottom surface of the floor 32 and away from the front guide section 22. As shown, in an exemplary embodiment of the invention, the guide threshold 34 is angled about one hundred and seventy five (175) degrees with respect to the bottom surface of the floor 32. The rear lip 36 extends from the guide threshold 34 and is bent about one hundred and eight (180) degrees and is positioned on a bottom planar surface of the guide threshold 34. In an exemplary embodiment shown, the rear lip 36 extends from each side end of the guide threshold 34.

Figure 6:
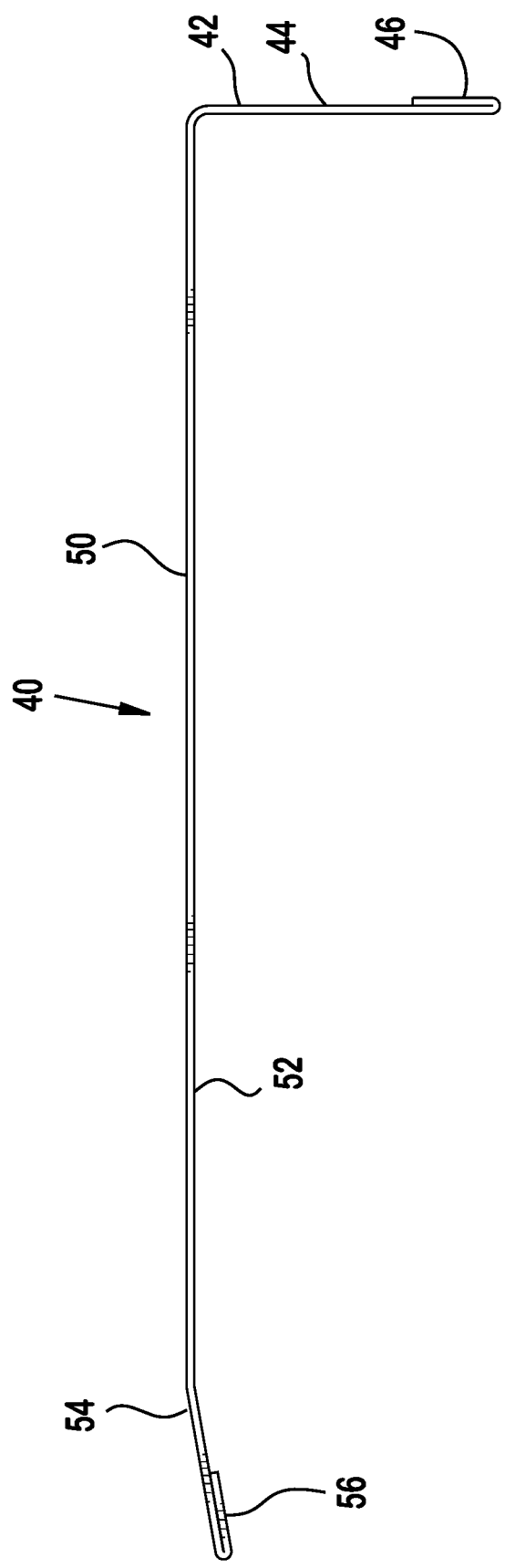
FIG. 6 is a left side view of a gutter shield of a roof waste removal assembly according to the invention.

With respect to FIG. 6, an exemplary gutter shield 40 is an elongated structured formed from a single piece of material, such as sheet metal. The gutter shield 40 generally includes a front guard section 42 and a rear guard section 50 positioned orthogonal to the front guide section 22.

As shown in FIG. 6, the front guard section 42 generally includes a rear wall 44 and a front overlap section 46. The front guard section 42 is an elongated planar body having a top and bottom surface extending downward from the rear guard section 50 by a bend in the gutter shield 40. As shown, the bend is a ninety (90) degree bend permitting the front guard section 42 and, more particularly, the rear wall 44 to be orthogonally positioned with respect to the rear guard section 50. The front overlap section 46 extends from the rear wall 44 and is bent about one hundred and eight (180) degrees and is positioned on a front planar surface of the rear wall 44. In an exemplary embodiment shown, the front overlap section 46 could also be bent such that it is positioned on a bottom planar surface of the rear wall 44 (not shown). The front overlap section 46 extends from each side end of the rear wall 44.

As shown in FIG. 6, the rear guard section 50 generally includes a cover section 52, a guard threshold 54, and a rear overlap section 56. The cover section 52 is an elongated planar body having a top and bottom surface extending away from the front guard section 42 by the bend in the roof guide 20. As shown, the bend is a ninety (90) degree bend permitting the rear wall 44 to be orthogonally positioned with respect to the cover section 52. The guard threshold 54 is an elongated planar body that extends from the cover section 52 and is angled with respect to the bottom surface of the cover section 52. More particularly, the guard threshold 54 extends away from the bottom surface of the floor 32 and away from the rear wall 44. As shown, in an exemplary embodiment of the invention, the guard threshold 54 is angled about one hundred and seventy five (175) degrees with respect to the bottom surface of the cover section 52. The rear overlap section 56 extends from the guard threshold 54 and is bent about one hundred and eight (180) degrees and is positioned on a bottom planar surface of the guard threshold 54. In an exemplary embodiment shown, the rear overlap section 56 extends from each side end of the guard threshold 54

Figure 2:
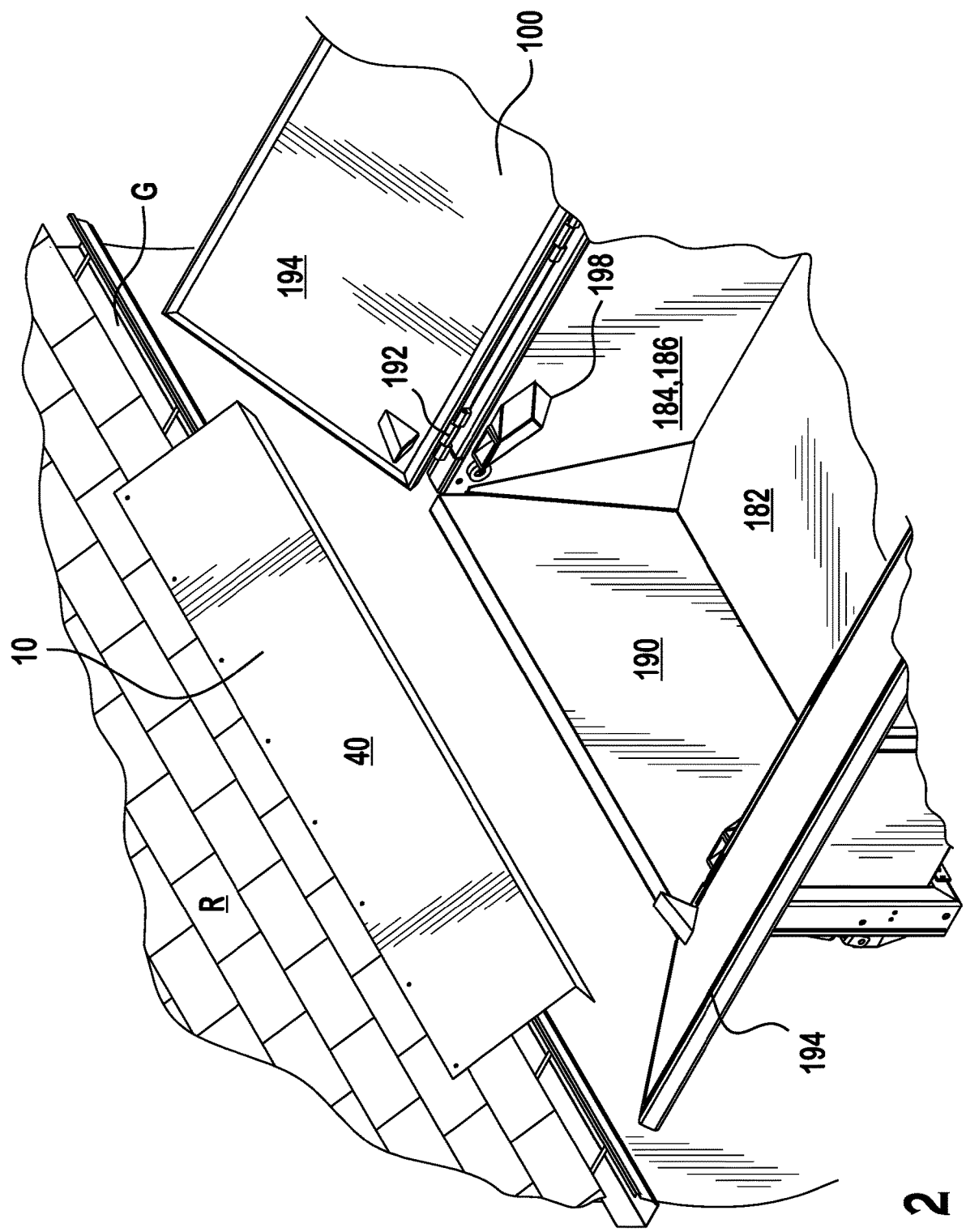
FIG. 2 is a close up perspective view of a chute system and an extension trailer of a roof waste removal assembly according to the invention.
Figure 7:
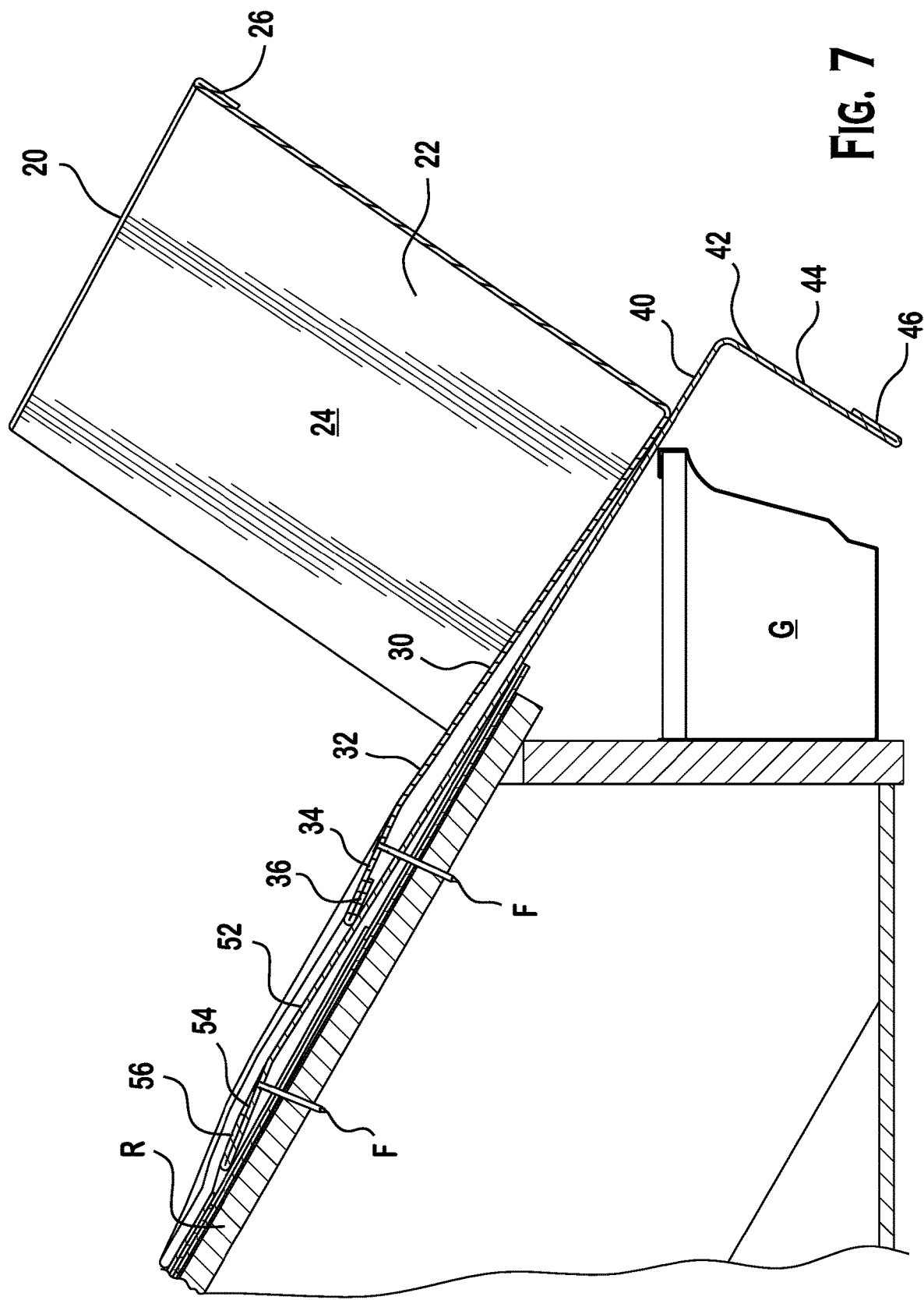
FIG. 7 is sectional view of the chute system of FIG. 2 taken along line 3-3 showing assembly of a pair of roof guides and a gutter shield to a known roof.

Now with referenced to FIGS. 1, 2 and 7, assembly of chute system 10 according to the invention will be described as being positioned on a known roof R.

In an exemplary embodiment of the invention, a pair of roof guides 20 are positioned on opposite sides of the roof R such that each roof guide 20 is angled to a center edge of the roof R. More particularly, the roof guides 20 are positioned such that the rear guide section 30 extends away from a gutter G of the roof R and one end of the front guide section 22 is positioned toward a center of the roof R and proximate the gutter G. This performed on both sides of the roof R and the roof guides 20 may set at varying angles to accommodate flow of debris to a center of the roof R. In an exemplary embodiment of the invention, the roof guides 20 may be positioned fifteen (15) to twenty (20) degrees with respect to the gutter G. Once skilled in the art should appreciate that one roof guide 20 may be used instead of the two shown in the exemplary embodiment.

Once the roof guides 20 are positioned, the gutter shield 40 is positioned on a roof R edge and covering ends of the roof guides 20. The gutter shield 40 is also positioned such that the rear guard section 50 is positioned over an opening of the gutter G and along the roof R edge. The front guard section 42 is positioned to cover the front surface of the gutter G.

With respect to FIGS. 1, 2, and 8-12, an expanding trailer 100 according to the invention is described. The expanding trailer 100 is a self-propelled trailer and shown and ready for towing by a power vehicle, such as a truck with a tow hitch. The expanding trailer 100 generally includes the following major components: a frame 110, a drive system 170, a storage bin 180, and an extension device 140.

Now with reference to FIG. 1, the frame 110 will be discussed. In the shown embodiment, the frame 110 includes a plurality of support beams 112, a plurality of connecting beams 120, a trailer hitch 122, a pair of drive wheels 124, a pair of steerable wheels 128, and a first actuator support 132.

As shown in FIG. 1, each support beam 112 is an elongated metal support extending along a length of the frame 110, from a trailing end to a leading end thereof.

Each connection beam 120 runs substantially perpendicular and connecting to the plurality of support beams 112 to form an undercarriage chassis 130. Each support beam 112 includes a first extension receiving bracket 114 positioned along a trailing end of the frame 110. The trailer hitch 122 is positioned and connected to a leading end of the frame 110, and, in particular, the plurality of support beams 112. The trailer hitch 122 includes a connector for connecting with a truck (i.e. ball mount).

The drive wheels 124 are positioned under the undercarriage chassis 130, while the steerable wheels 128 are positioned between the trailer hitch 122 and the rear drive wheel 124, as shown in the exemplary embodiment of FIG. 1. However, one skilled in the art would appreciate that other designs are possible. For instance, the steerable wheels 128 may also be positioned at different positions along the undercarriage chassis 130.

Now with reference to FIGS. 1, 2, and 8-12, the extension device 140 according to the invention will be described. As shown, the extension device 140 includes the following major components: a first extension section 142, a second extension section 152, and a storage bin platform section 164.

With reference to FIG. 1, the first extension section 142 is shown and generally includes a pair of lower supports 144, a lower cross member support 146, an upper extension support 148, and a pair of lower lifting actuators 150 that are positioned between and connecting the frame 110 and the first extension section 142. The first extension section 142 is pivotally mounted to the frame 110.

With reference to FIG. 1, the second extension section 152 is shown and includes a pair of upper supports 154, a first upper cross member support 156, and a pair of upper lifting actuators 160 that are positioned between and connecting the first extension section 142 and the second extension section 152, with the leading end of the first extension section 142 pivotally mounted to a trailing end of the second extension section 152.

With reference to FIGS. 1, 2, and 8-12, an exemplary embodiment of the storage bin platform section 164 is shown and generally includes a pair of platform support members (not shown) connected together by a plurality of platform cross members (not shown). In an exemplary embodiment, each platform support members (not shown) is an elongated tubular member receiving the pair of upper supports 154.

In an exemplary embodiment shown in FIG. 1, a drive system 170 is provided and generally includes a power system 172 and a control system 174 connected to the power system 172.

In the shown embodiment, the power system 172 includes an internal combustion engine (not shown), a battery (not shown) connected to the combustion engine (not shown), a hydraulic motor (not shown) also connected to the combustion engine (not shown), a hydraulic pump (not shown) connected to the hydraulic motor (not shown). Many of the power system components are not shown for sake of complexity in the drawings, although a discussion is provided for purposes of enabling one skilled in the art to understand how the drive system is assembled and performed.

The small internal combustion engine (not shown) powers the drive system 170. However, the drive system 170 could be powered by other known mechanisms including an electric motor powered by a battery or other sources. In the shown embodiment, the power system 172 is interconnected with drive wheels 124 by a hydraulic motor (not shown) installed adjacent to the drive wheels 124 and interconnected to the hydraulic pump (not shown) by hydraulic lines.

One skilled in art should appreciate that other designs are possible. For instance, the power system 172 may include other methods to move the drive wheels 124, including chains, belts, or a drive shaft and a transmission connected to the combustion engine (not shown), so that expanding trailer 100 can be moved around a work site under its own power.

Regardless of the specific mode of powering the drive wheels 124, the power system 172 connects to the control system 174 for starting, and stopping the drive wheels 124, as well as for regulating the speed of the drive wheels 124. The control system 174 includes a plurality of controls which may be a series of buttons, levers, or other suitable controls which allow the operator to control retracting, lowering, and steering of the steerable wheels 128, and power to the drive wheels 124.

In an embodiment, user controls may be provided on the control system 174 for controlling certain other features of the expanding trailer 100. As shown in the embodiment of FIG. 1, an operator stand may be provided in the vicinity of the control system 174, allowing an operator to move along with the expanding trailer 100 as the operator controls the expanding trailer 100 movement. The control system 174 therefore provides the operator with the ability to control all features of the expanding trailer 100 from a single location, while standing on the operator stand and moving along with the expanding trailer 100 as the expanding trailer 100 travels under its own power.

Now with reference to FIGS. 1, 2, and 8-12, an exemplary storage bin 180 according to an embodiment of the invention is shown and generally includes a platform 182, a plurality of retaining walls 184, a tailgate 190, a pair of cover sections 194, and pair of extender receiving channels 198.

The platform 182 includes a planar section extending substantially parallel with the frame 110. In the shown embodiment, the platform 182 is a rectangular metal plate. However, one skilled in the art should appreciate that the platform 182 could be manufactured using different shapes and other materials, such as lumber, composite, and other metals. For instance, the platform 182 may include a framed metal structure on which a plurality of wood planks are arranged.

The plurality of retaining walls 184 includes a pair of side retaining walls 186 and a retaining end wall 188. In the shown embodiment, each retaining wall 184 is metal plate. However, one skilled in the art should appreciate that each retaining wall 184 could be manufactured using other materials, such as lumber, composite, and other metals. For instance, each retaining wall 184 may include a framed metal structure on which a plurality of wood planks is disposed along the framed metal structure.

The plurality of retaining walls 184 is positioned and secured along outer edges of the platform 182 and, in particular, along a top planar surface thereof. In the shown embodiment, the pair of side retaining walls 186 are positioned along opposite longitudinal sides of the platform 182, while the retaining end wall 188 is positioned at trailing end of the platform 182. Each retaining wall 184 extends substantially perpendicular with respect to the top planar surface of the platform 182. Each retaining wall 184 is mechanically secured to the platform 182, for instance, using a weld or plurality of known mechanical fasteners. In addition, the retaining end wall 188 is secured to a pair of common ends of the side retaining walls 186. In the embodiment shown, the retaining end wall 188 is mechanically secured to the pair of side retaining walls 186, for instance, using a weld or other known mechanical fasteners or adhesives.

As shown, the tailgate 190 is positioned along a leading end of the platform 182, opposite the retaining end wall 188 positioned along the trailing end thereof. In the embodiment shown, the tailgate 190 is made of a metal. However, one skilled in the art should appreciate that the tailgate 190 could be manufactured using other materials, such as lumber, composite, and other metals. For instance, tailgate 190 may include a framed metal structure on which a plurality of wood planks is disposed along the framed metal structure.

As shown, the tailgate 190 is positioned along an outer edge of the platform 182 and extends substantially perpendicular to the top planar surface thereof. The tailgate 190 is secured to the platform 182, for instance, through a rotating fastener device, such as a rotating hinge 192 positioned at bottom of the tailgate 190 and connecting to the platform 182. The rotating hinge 192 permits rotation of the tailgate 190 from a secured closed vertical position to one in which the tailgate 190 rotates away from the retaining end wall 188 making the platform 182 accessible. However, one skilled in the art should appreciate that other design are possible. For instance, the tailgate 190 may be pivotably mounted to side retaining walls 186 such that the tailgate 190 pivots away from the outer edge of the platform 182 or from the side retaining walls 186, much like known dump trucks.

Each cover section 194 is a rectangular metal structure having a planar surface. Each cover section 194 is positioned along and connected to upper outer edges of the pair of side retaining walls 186 using a plurality of hinges. However, one skilled in the art should appreciate that other designs are possible. For instance, other known rotating mechanisms could be used. Each cover section 194 measures approximately half a width as measured between the pair of side retaining walls 186.

A pair of extender receiving channels 198 are provided and positioned along a opposite sides retaining walls 184. In particular, each extender receiving channel 198 is disposed along an inner surface of the storage bin 180 and positioned proximate the tailgate 190, and angled at approximately 45 degrees in the embodiment shown. Each extender receiving channel 198 is a metal elongated channel that is secured or welded to the retaining wall 184 and capable of receiving a pole or shaft. In an exemplary embodiment, the extender receiving channel 198 is rectangular shaped with an open end configured to receive an extension shaft and closed end to abut a leading end of a pole or shaft positioned in the elongated channel. As mentioned, in an exemplary embodiment of the invention, the extender receiving channel 198 is angled with respect to the platform 182 with the open end extending toward the tailgate 190. For instance, the extender receiving channel 198 is positioned at a 45 degree angle with respect to a plane extending across top surfaces of both side retaining walls 186 and tailgate 190 so that a pole or shaft positioned in the extender receiving channel 198 extends over beyond that plane.

Now with referenced to FIG. 1, assembly of expanding trailer 100 according to the invention will be described.

The drive wheels 124 are positioned under the undercarriage chassis 130 and connected to the drive system 170 using a known transmission. Likewise, the steerable wheels 128 are also connected to the drive system 170 and, in particular, to the control system 174 having the plurality of controls which may be a series of buttons, levers, or other suitable controls which allow the operator to control retracting and lowering and steering of the steerable wheels 128 and power to the drive wheels 124.

The retaining walls 184 are firmly secured to the platform 182 using mechanical welds. The tailgate 190 is secured to the leading end of the platform 182 using the rotating hinge (not shown), while each cover section 194 is secured along the upper outer edges of the pair of side retaining walls 186 using the plurality of hinges, such that each cover section 194 can rotate toward each other.

The extension device 140 is secured to frame 110. In particular, the trailing end of the first extension section 142 is secured to the trailing end of the frame 110. The lower supports 144 are rotatably mounted to the frame 110. One skilled in the art should appreciate that other fasteners could be used, including, nuts and bolts, screws, and pins.

Furthermore, the pair of lower lifting actuators 150 also secure the frame 110 to first extension section 142. The lower lifting actuators 150 are connected to the drive system 170 using hoses and, in particular, to the hydraulic motor (not shown)

A leading end of the first extension section 142 is secured a trailing end of the second extension section 152 using a fastener, such as a locking pin L. One skilled in the art should appreciate that other fasteners could be used, including, nuts and bolts, screws, and pins.

The pair of upper lifting actuators 160 connect to both the first extension section 142 and the second extension section 152. The upper lifting actuators 160 is connected to the drive system 170 using hoses and, in particular, to the hydraulic motor (not shown).

The second extension section 152 connects to the storage bin platform section 164. A fastener, such as a locking pin L, is used to rotatably mount the second extension section 152 with the to the storage bin platform section 164. One skilled in the art should appreciate that other fasteners could be used, including, nuts and bolts, screws, and pins.

The storage bin 180 is secured to the storage bin platform section 164, for instance, using a mechanical weld. However, one skilled in the art should appreciate that other fastening mechanisms could be used, including, nuts and bolts, screws, and adhesives.

Now with reference to FIGS. 1 and 2, operation of the expanding trailer 100 according to the invention will be described.

Building materials can be loaded and secured in the storage bin 180 at a location different than the work site. A truck (not shown) connects to the frame 110 using the trailer hitch 122. The operator raises the steerable wheels 128 and drive wheels 124 are set to disengage with drive system 170 using the control system 174. The expanding trailer 100 then can operate as a standard trailer and be towed behind the connected truck to the work site.

The operator lowers the steerable wheels 128 so that they can support the frame 110 and disconnects the frame 110 from the truck. The operator then uses the control system 174 to move the expanding trailer 100 to a desired location on the work site using the drive system 170, as described above. The operator may now use the control system 174 to stabilize the expanding trailer 100.

Once the operator has determined that the expanding trailer 100 is in position to unload building materials from the storage bin 180, the operator then uses the control system 174 to control the expanding trailer 100 and position of the storage bin 180 such that a leading end sits under the chute system 10.

The operator can use the control system 174 to control the vertical and horizontal position of the storage bin 180 using the lower lifting actuator 150 and the upper lifting actuators 160. By adjusting the different angles of the first extension section 142, the second extension section 152, and the storage bin platform section 178 with respect to each other and the frame 110, the operator can adjust the height and position of the storage bin 180 with respect to the chute system 10. In another embodiment, the operator can slide the storage bin 180 horizontally with respect to frame 110 using a hydraulic sliding actuator (not shown).

With respect to FIGS. 8-17, another roof waste removal assembly 1 according to the invention is shown and includes extender 200 adapted to connected to the expanding trailer 100 described above. For sake of brevity, only the extender 200 will be described.

Figure 8:
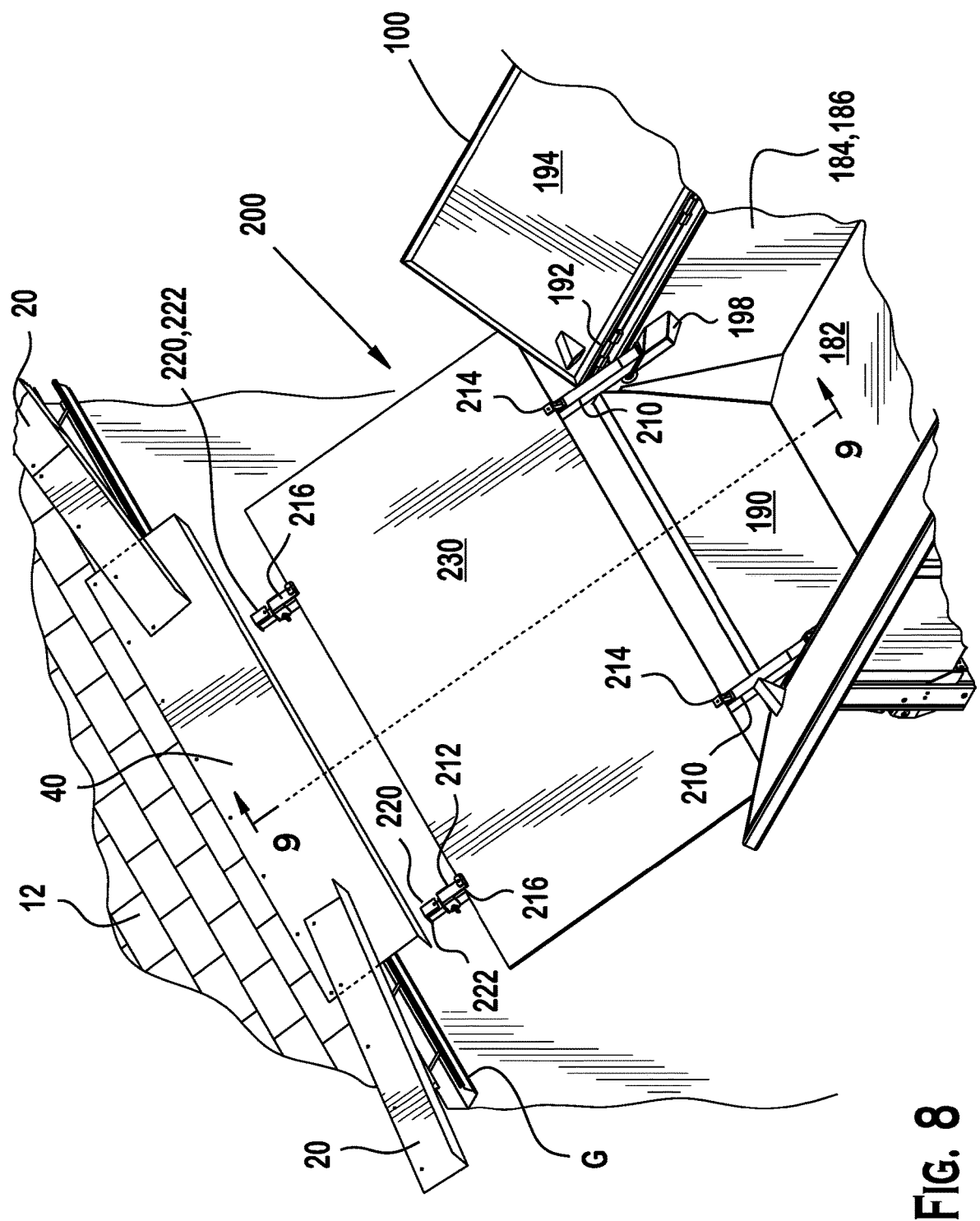
FIG. 8 is another perspective view of a roof waste removal assembly according to the invention assembled on a known roof top.
Figure 12:
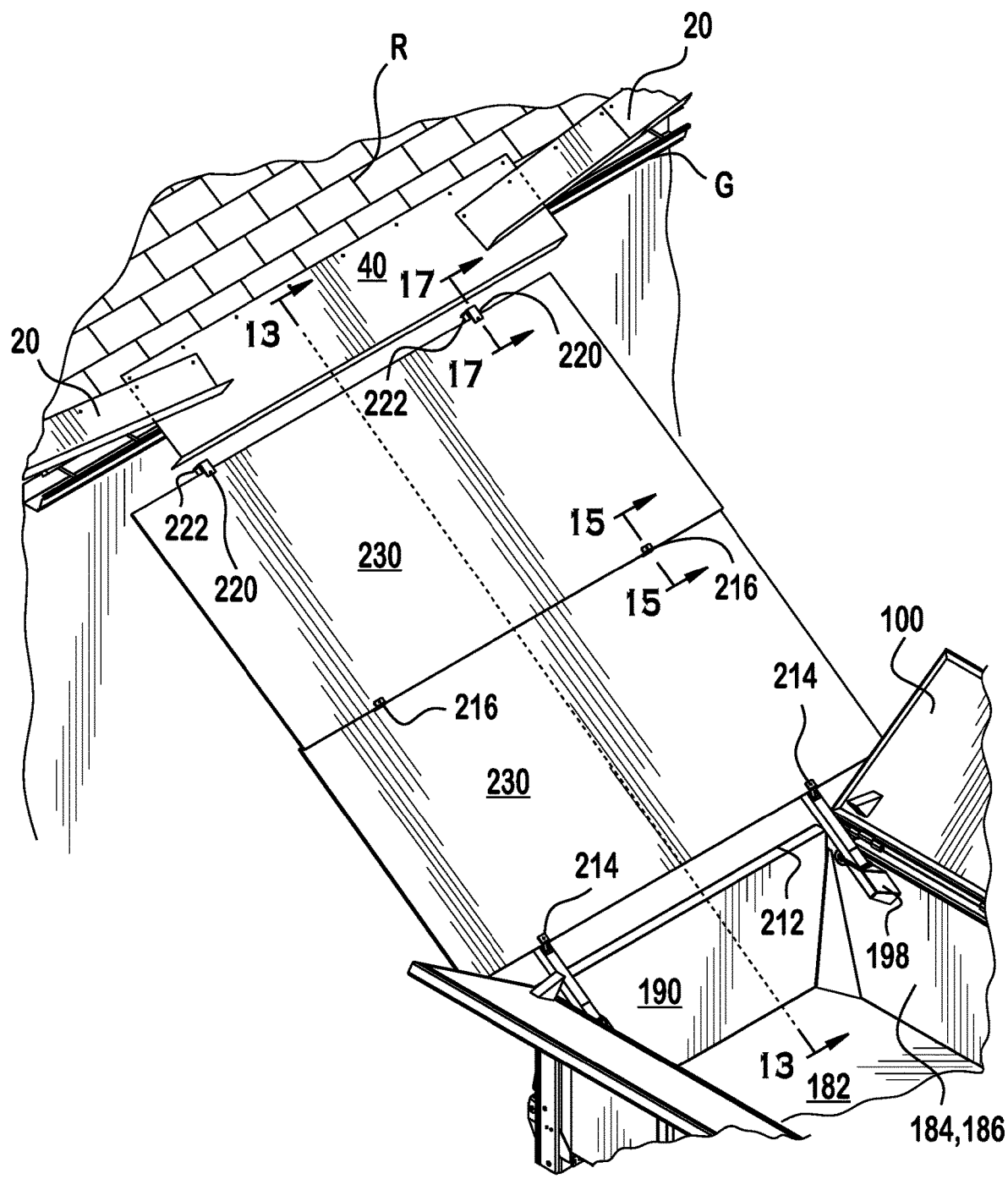
FIG. 12 is another perspective view of a roof waste removal assembly according to the invention assembled on a known roof top.

With reference to FIG. 8, an exemplary extender 200 is shown and generally includes a pair of extension arms 210 and one or more guard panels 230 (FIG. 8 shows use of one guard panel 230; FIG. 12 shows use of a pair of guard panels 230.

Now, with reference to FIGS. 10-17, the pair of extension arms 210 will be described. Each extension arm generally a two piece construction having a front arm 212 and a sliding support arm 220.

Figure 15:
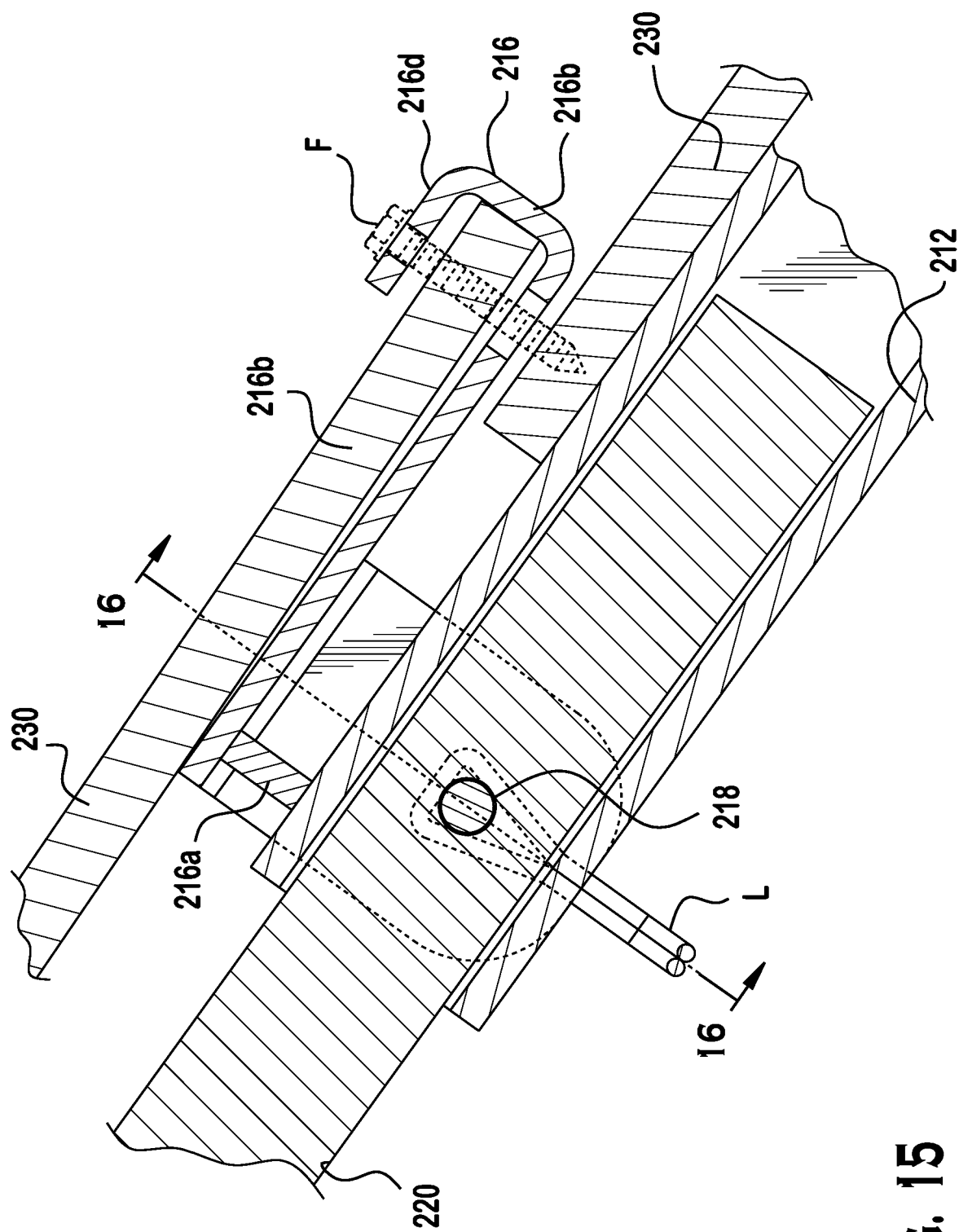
FIG. 15 is a sectional view of the extender of the roof waste removal assembly of FIG. 12 taken along line 15-15.
Figure 16:
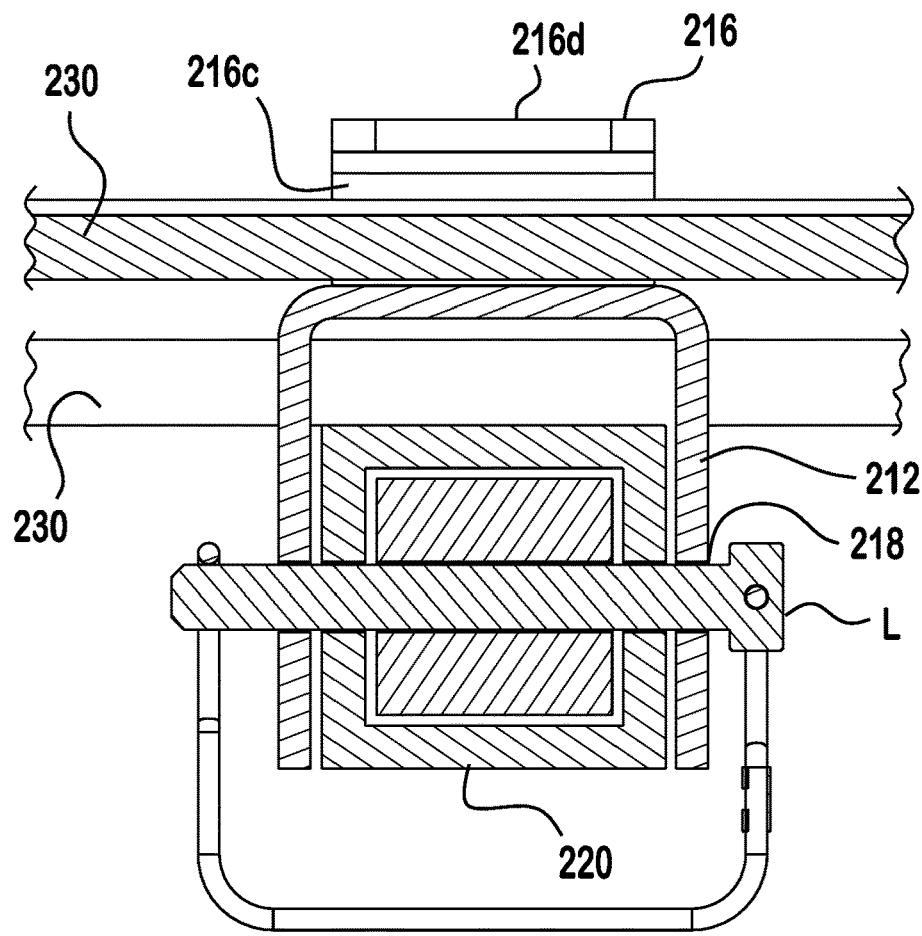
FIG. 16 is another sectional view of the extender of the roof waste removal assembly of FIG. 12 taken along line 16-16.

As shown in FIGS. 10 and 11, the front arm 212 is an elongated structural beam and, in the shown embodiment, a tubular metal beam having a sliding support arm receiving passageway 213 opening from a lead end thereof and extending there through a body of first arm 212. The sliding support arm receiving passageway 213 is shaped to receive the sliding support arm 220 and, as shown in FIGS. 15 and 16, a cross section area of the sliding support arm receiving passageway 213 is larger than a cross section area of the sliding support arm 220. As a result, a trailing end of the sliding support arm 220 is positioned through the sliding support arm receiving passageway 213 to extend and retracted (FIG. 10 shows retracted position, and FIG. 11 shows an extended position).

Figure 14:
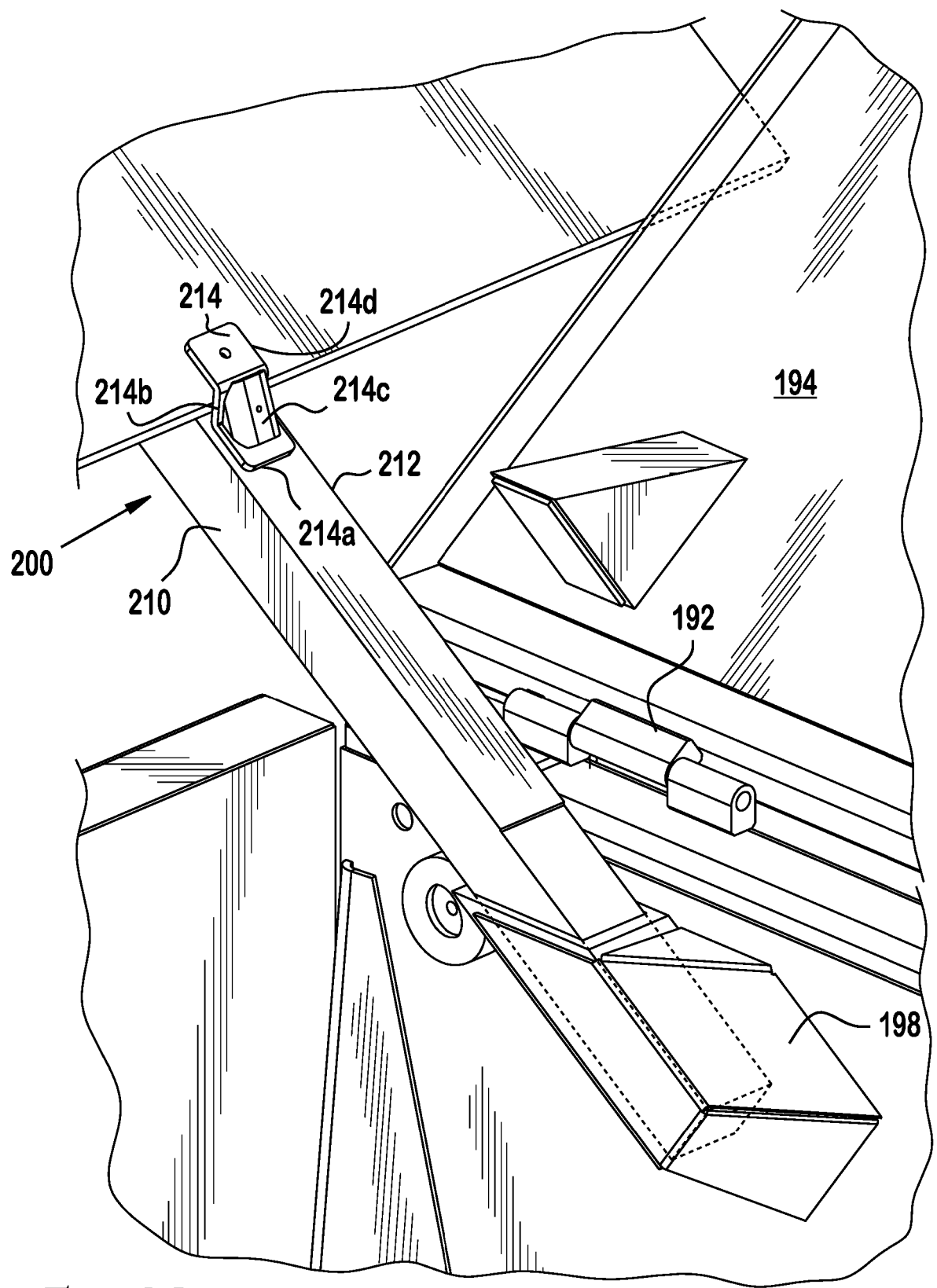
FIG. 14 is a partial perspective view of a first arm of an extender of the roof waste removal assembly of FIG. 12.

As shown in FIGS. 10, 14, and 15, the front arm 212 includes a front panel catch 214 positioned on a trailing end thereof, a middle panel catch 216 positioned on a leading end thereof, and lock receiving passageway 218 positioned at the leading end thereof and extending completely there through (see FIG. 16).

FIG. 14 shows a front panel catch 214 secured to an upper surface of the first arm 212. The front panel catch 214 is Z-shaped bracket member having an arm mount section 214a secured to the top surface of the first arm 212, a wall section 214b extending orthogonal to the arm mount section 214a, a support 214c extending and connecting the arm mount section 214a and the wall section 214b, and a panel mount section 214d extending orthogonal to the wall section 214b and parallel to the arm mount section 214a but extending in the opposite direction. The arm mount section 214a is permanently secured to the upper surface of the first arm 212, and the support 214c is a tubular member permanently secured to the arm mount section 214a and the wall section 214b in order to provide added support to the wall section 214b. The panel mount section 214d includes a fastener receiving passageway extending completely there through.

FIG. 15 shows a middle panel catch 216 secured to the upper surface of the first arm 212. The middle panel catch 216 is another shaped bracket member having an arm mount section 216a secured to the top surface of the first arm 212, a first panel mount section 216b extending orthogonal to the arm mount section 216a, a wall section 216c extending orthogonal to first panel mount section 216b and parallel to the arm mount section 216a, and a second panel mount section 216d extending orthogonal to the wall section 216c and parallel to the first panel mount section 216b. The arm mount section 216a is permanently secured to the upper surface of the first arm 212. The first panel mount section 216b and the second panel mount section 216d include a fastener receiving passageway extending completely there through and correspond with each other.

Figure 17:
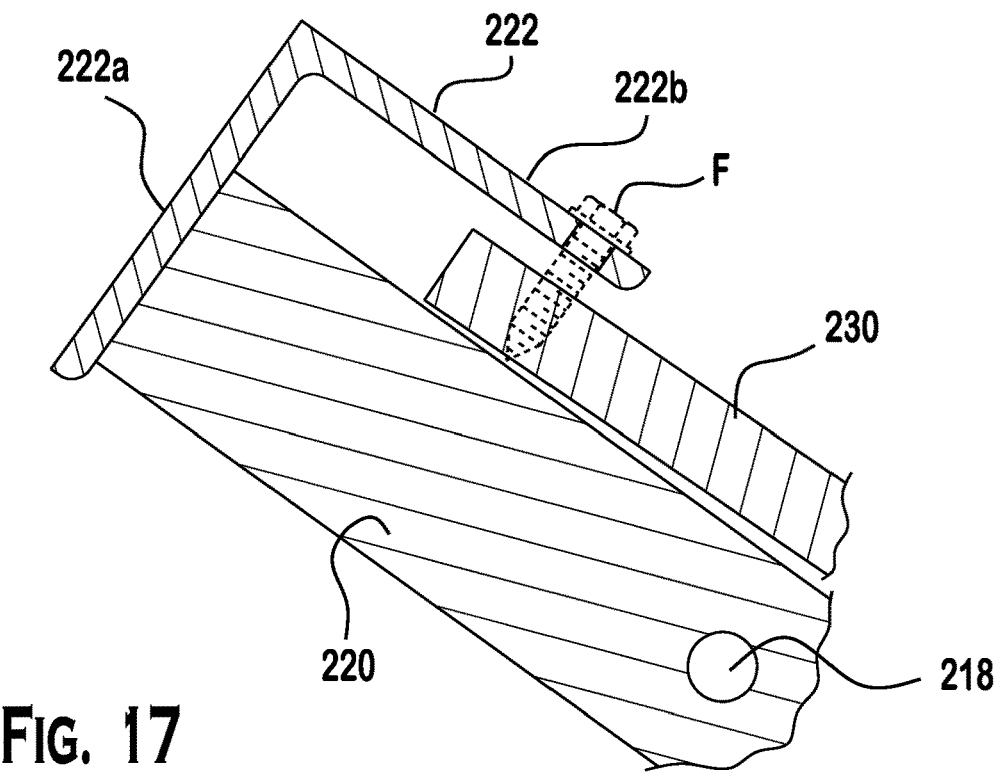
FIG. 17 is another sectional view of the extender of the roof waste removal assembly of FIG. 12 taken along line 17-17.
Figure 18:
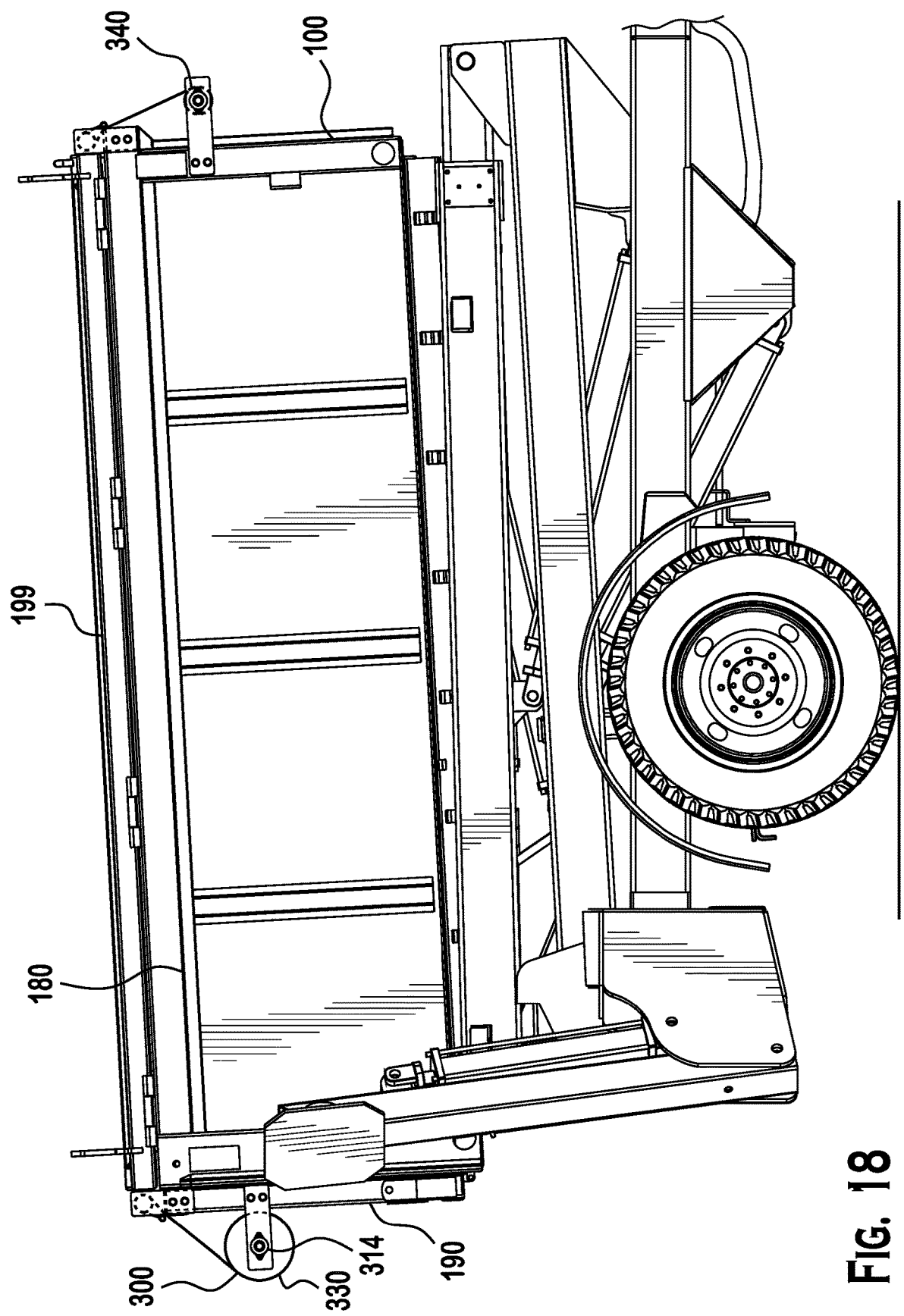
FIG. 18 is a side view showing a roller tarp attached at front and on tailgate of a dump box.
Figure 19:
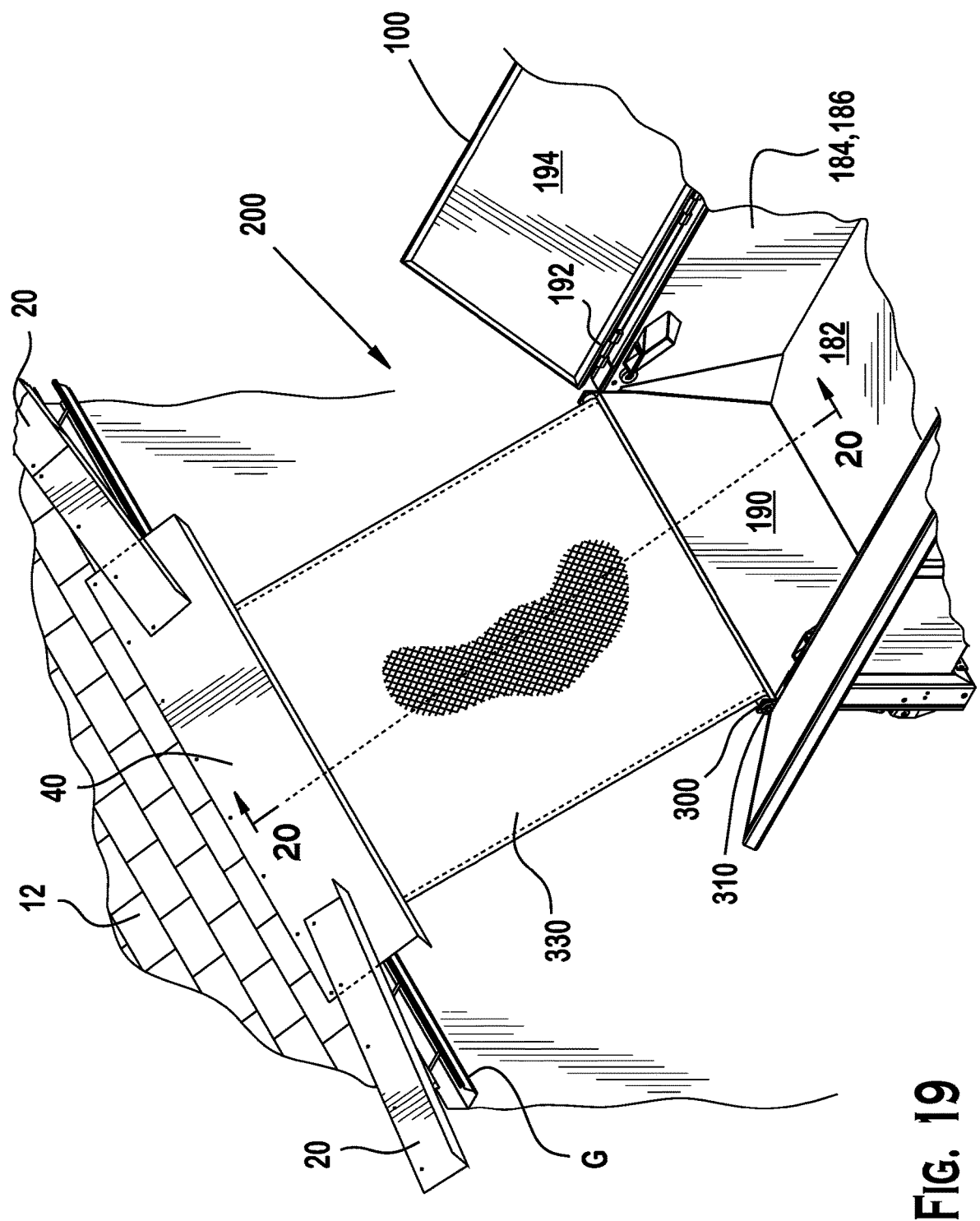
FIG. 19 is similar perspective showing roller tarp dispensed from tailgate to soffit area.
Figure 20:
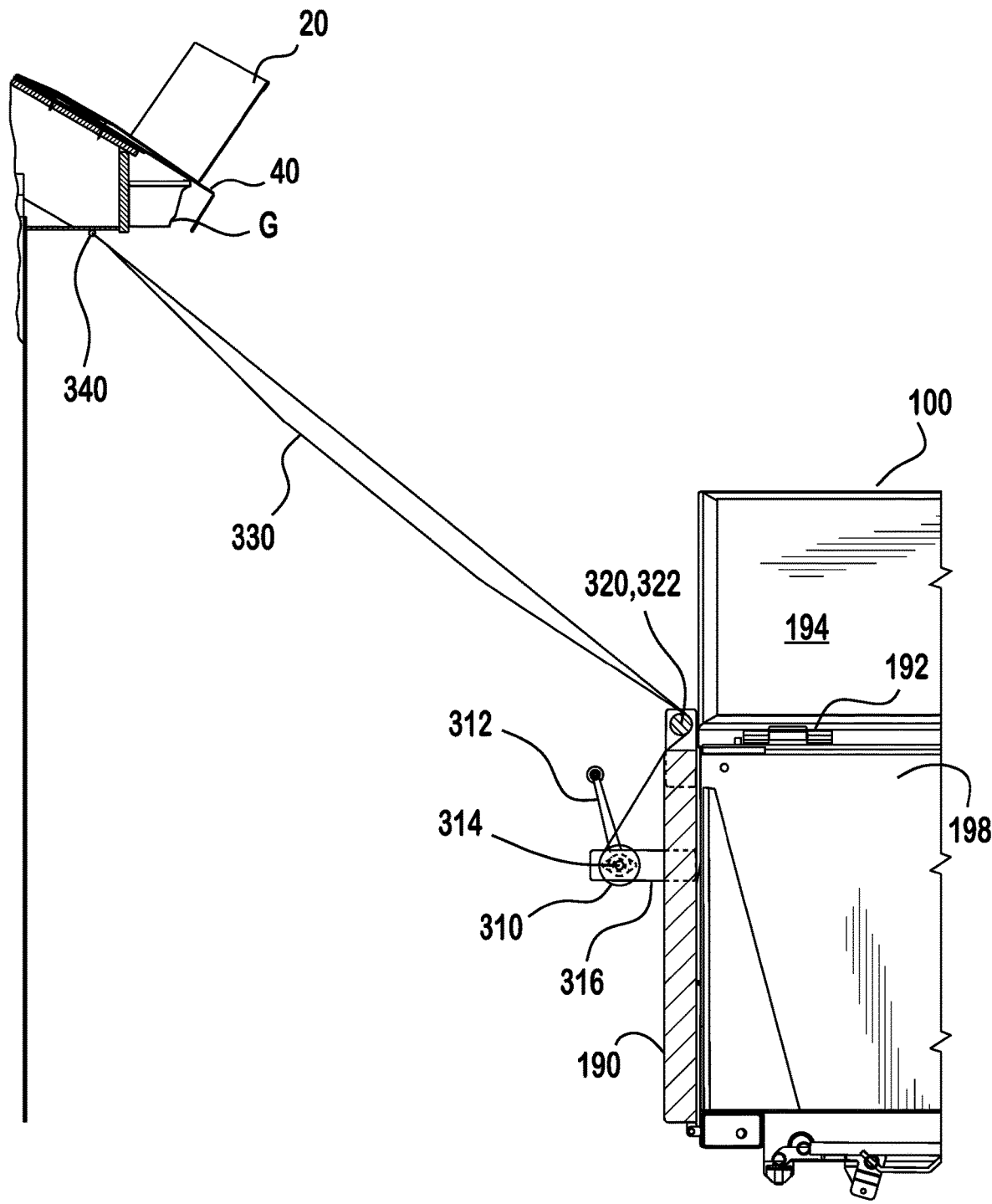
FIG. 20 is a section of FIG. 19.
Figure 21:
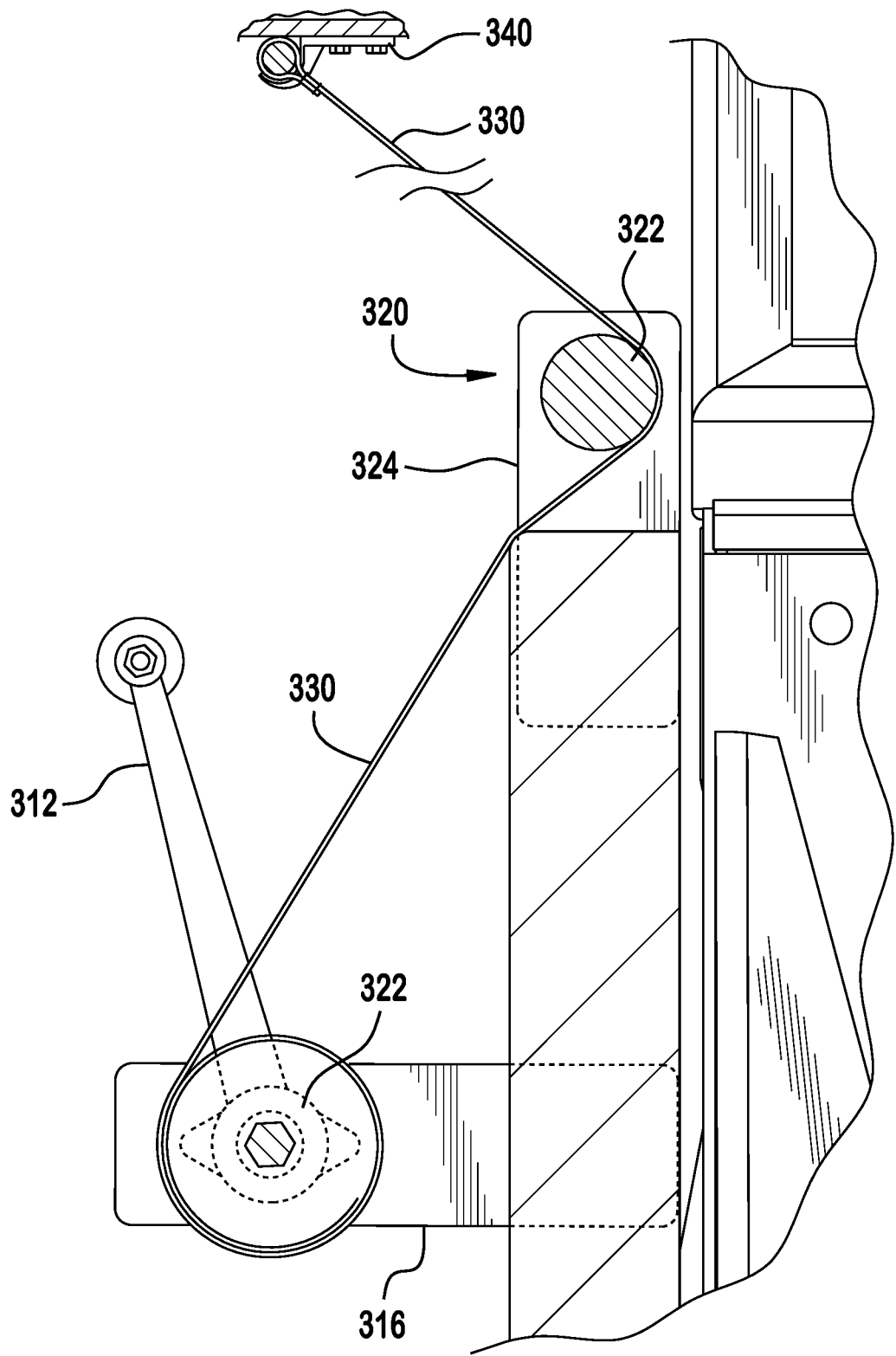
FIG. 21 is an enlarged view of the take up roller, reversing directional roller atop the tailgate and tarp fastened to soffit.
Figure 22:
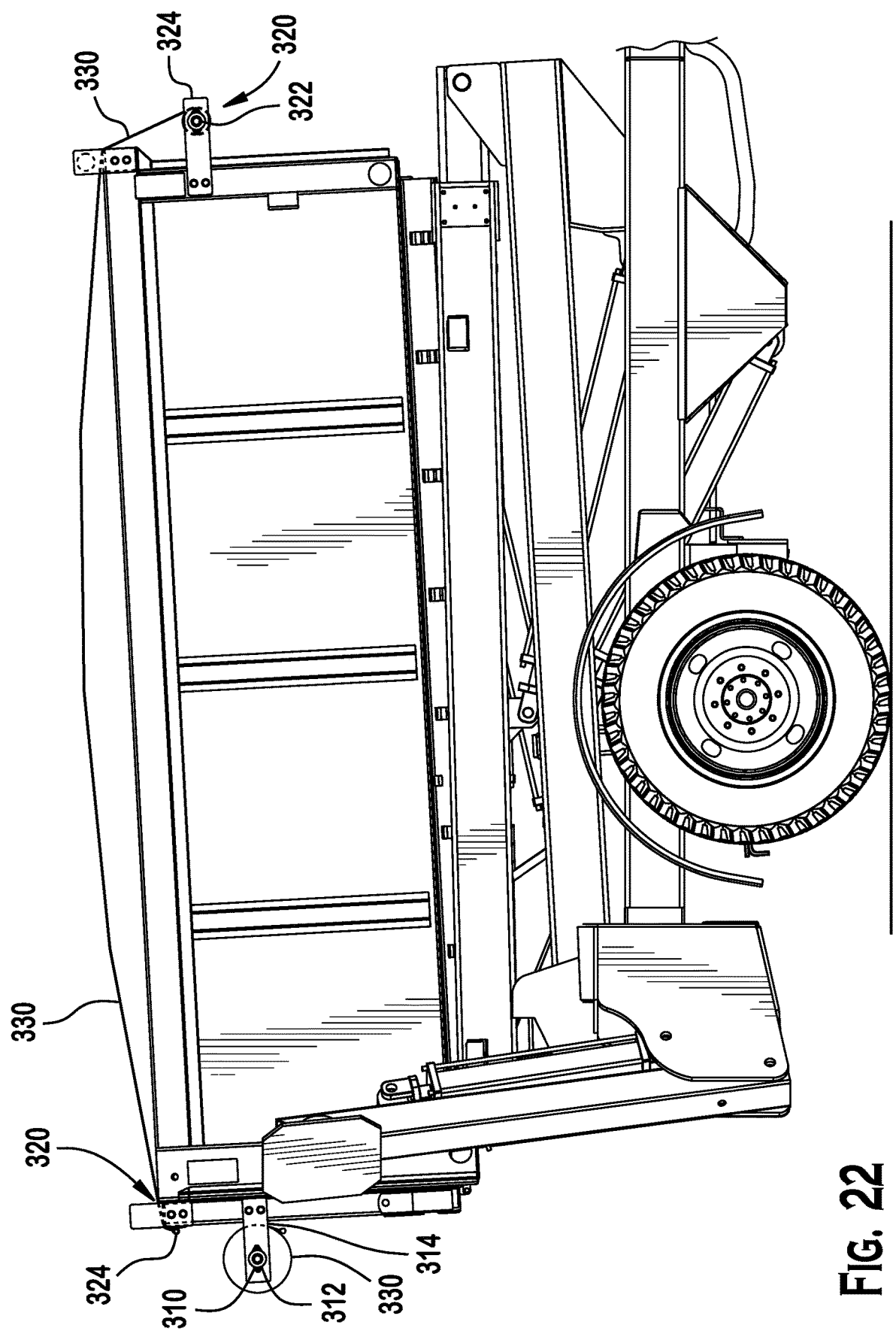
FIG. 22 is an alternative application of a tarp to cover the load/debris. Such as the RB3000 that does not have cover panels. Feel free to exclude if not applicable.

As shown in FIGS. 11, 12, and 17, the sliding support arm 220 is an elongated structural beam and, in the shown embodiment, a tubular metal beam. The sliding support arm 220 is shaped and sized to correspond with the sliding support arm receiving passageway 213, As shown in FIGS. 15 and 16, a cross section area of the sliding support arm receiving passageway 213 is larger than a cross section area of the sliding support arm 220. As a result, a trailing end of the sliding support arm 220 is positioned through the sliding support arm receiving passageway 213 to extend and retracted (FIG. 10 shows retracted position, and FIG. 11 shows an extended position).

The sliding support arm 220 includes a rear panel catch 222 positioned on a lead end thereof and a lock receiving passageway 224 positioned at the leading end thereof and extending completely there through (see FIGS. 15 and 16). The rear panel catch 222 is secured to an upper surface of the sliding support arm 220. The rear panel catch 222 is L-shaped bracket member having an arm mount section 222a secured to an end surface of the sliding support arm 220 and a panel mount section 222b extending orthogonal to the arm mount section 222a and parallel top surface of the sliding support arm 220. The arm mount section 222a is permanently secured to the upper surface of the sliding support arm 220. The panel mount section 222b includes a fastener receiving passageway extending completely there through.

In an exemplary embodiment of the invention, each guard panel 230 is a rectangular planar member. The guard panel 230 can be a sheet of metal or a cut of wood, such as plywood.

Now with referenced to FIGS. 8-17, assembly of extender 200 according to the invention will be described.

Figure 9:
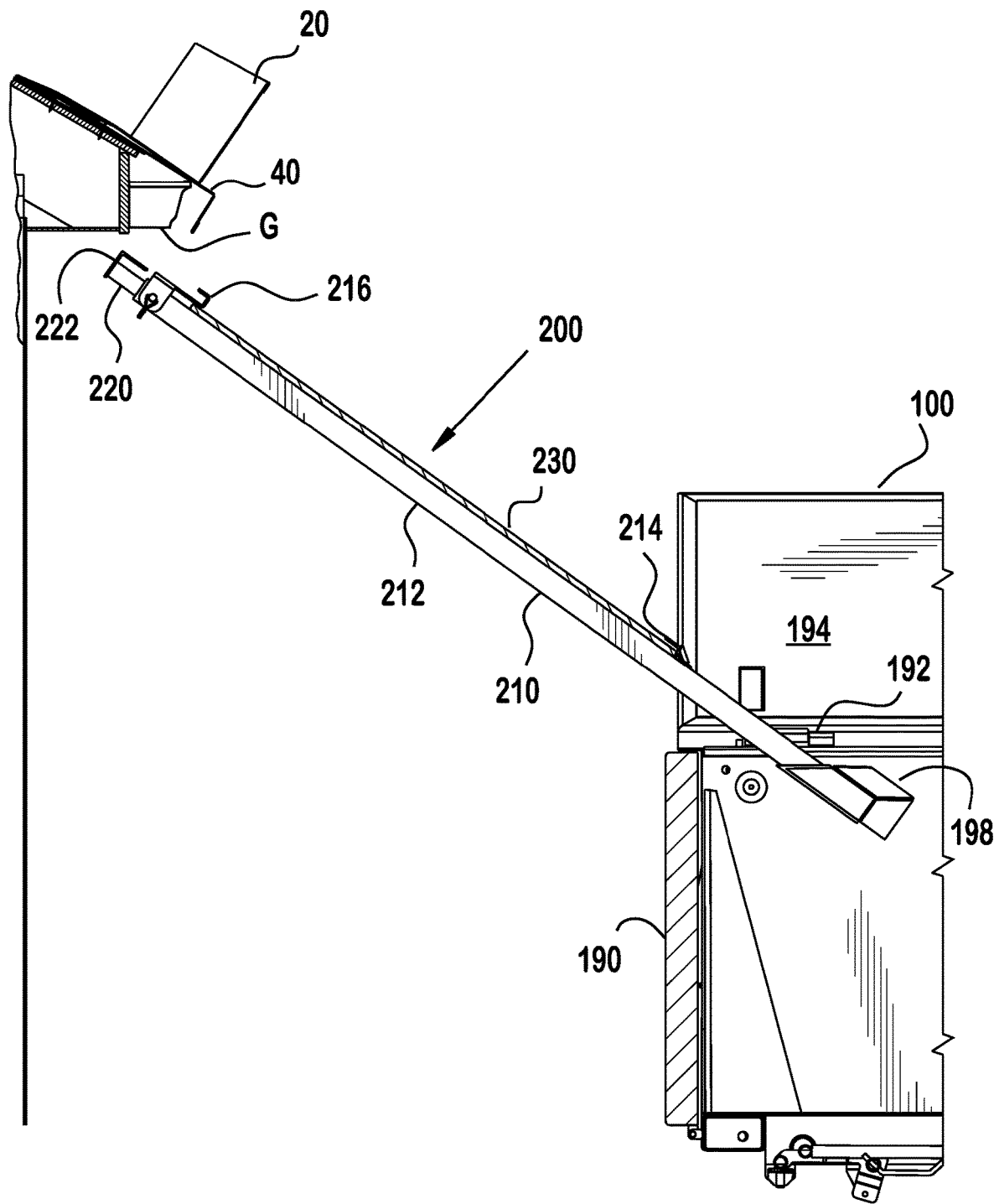
FIG. 9 is a sectional view of an extender of the roof waste removal assembly of FIG. 8.

As shown in FIGS. 8 and 9, each extension arm 210 is positioned in the pair of extender receiving channels 198 of the expanding trailer 100. More particularly, a leading end of the front arm 212 is positioned through the extender receiving channel 198 and may be secured using a fastener or locking system (not shown).

In transport, the sliding support arm 220 is securely positioned in the front arm 212 using a locking pin L through the lock receiving passageway 218, 224. When the locking pin L is removed, the sliding support arm 220 can extend outward from the front arm 212. A guard panel 230 can be fitted between the front panel catch 214 and the middle panel catch 216, and then retracted back into the front arm 212 such that the guard panel 230 bias the wall section 214b and arm mount section 216a. The locking pin L is reinserted through the lock receiving passageway 218, 224. A fastener (i.e. screw) can be used to further secure the guard panel 230 between the front panel catch 214 and the middle panel catch 216.

Figure 13:
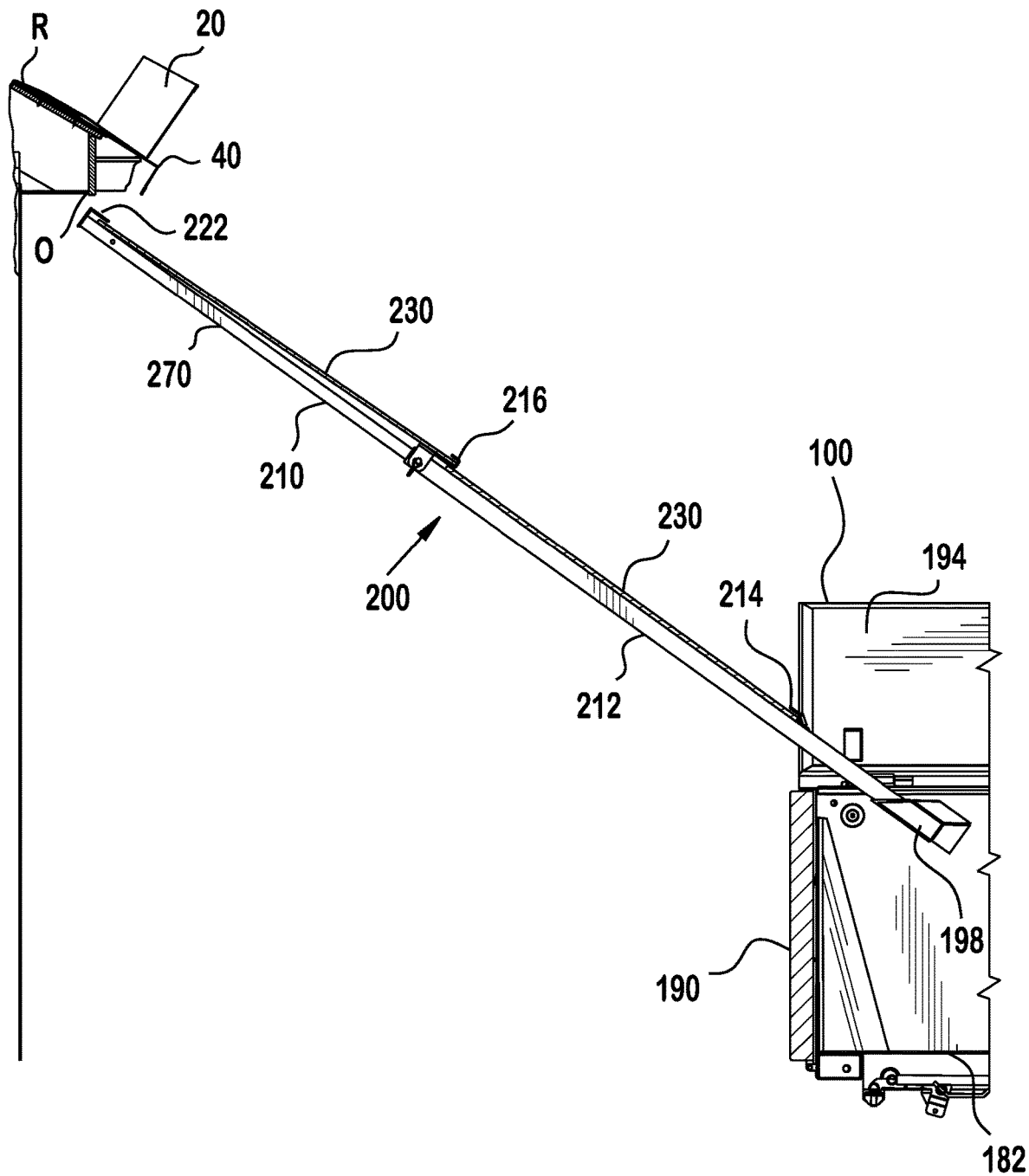
FIG. 13 is a sectional view of an extender of the roof waste removal assembly of FIG. 12 taken along line 13-13.

In the embodiment shown in FIGS. 12 and 13, another guard panel 230 is used. The sliding support arm 220 can extend further outward from the front arm 212 to accommodate the second guard panel 230 which is secured between the middle catch A guard panel 230 can be fitted between the front panel catch 214 and the middle panel catch 216, and then retracted back into the front arm 212 such that the guard panel 230 bias the wall sections 216c and panel mount section 222b. Once the second guard panel 230 is positioned, yje locking pin L is reinserted through the lock receiving passageway 218, 224. A fastener (i.e. screw) can be used to further secure the guard panel 230 between the middle panel catch 216 and the rear panel catch 222.

As shown in FIGS. 8, 9 and 12, an operator can positon the expanding trailer 100 such that the leading end of the guard panel 230 is positioned right below the gutter shield 40.

With reference to FIGS. 18-22, another exemplary extender 300 is shown and generally includes a wind-up mechanism 310, a cover guide 320, a cover 330, and cover catch 340.

As shown, in an exemplary embodiment of the invention, the wind-up mechanism 310 includes a wind-up device 312, a roller bar 314, and a pair of mounting plates 316. In the shown embodiment, the wind-up device 312 is a manual ratcheting wind-up device having a crank handle and a ratcheting system. One skilled in the art should appreciate that a motorized wind-up device 312 could be used. The wind-up device 312 is securely connected to the roller bar 314 that extends a width of the storage bin 180. As the wind-up device 312 turns, the roller bar 314 turns. The roller bar 314 is positioned along the tail gate 190 by pair of mounting plates 316, which can be secured by fasteners or welding.

In an exemplary embodiment, the cover guide 320 includes a guide bar 322 positioned above the wind-up mechanism 310 and secured to the storage bin 180 using a pair of attachment brackets 324. The guide bar 322 may include a roller bearings 326 so that the guide bar 322 can freely rotate with little resistance between the attachment brackets 324.

In an exemplary embodiment, the cover 330 is a tarp like sheet of material. One end is connected to the roller bar 314 and can be rolled up by the wind-up device 312. The other end is feed between the guide bar 322 and the tail gate 190, and then is feed away from the storage bin 180.

As shown, the extender 300 may include a cover catch 340 to hold the cover 330 to the guide bar 322 during travel or below the gutter G during using. More specifically, the extender 300 may include a plurality of 332 hooks or fasteners that secure to the guide bar 322 or the gutter shield 40 or gutter G. In the shown embodiment, the expanding trailer 100 includes another cover guide 320 positioned on an opposite end of the storage bin 180 so that the cover 330 can cover the storage bin 180 during travel.

When the cover 330 is released by the wind-up mechanism 310, the cover can be positioned between the roof R and the storage bin 180, so that debris can be urged from the roof R, over the gutter shield 40, and down to the storage bin 180 via the cover 330.

The foregoing illustrates some of the possibilities for practicing the invention. Many other embodiments and fields of use for the roof waste removal assembly 1 are possible and within the scope and spirit of the invention. It is therefore intended that the foregoing description be regarded as illustrative rather than limiting.

What is claimed is:
1. A roof waste removal assembly comprising:
   a chute system having:
      a roof guide, the roof guide is an elongated structured formed from a single piece of material and includes a front guide section and a rear guide section positioned orthogonal to the front guide section; and
      a gutter shield;
   a self-propelled expanding trailer having:
      a frame;
      an extension device secured to the frame; and
      a storage bin secured to the extension device.
2. The roof waste removal assembly of claim 1, wherein the front guide section includes a front wall and a front lip.
3. The roof waste removal assembly of claim 2, wherein the front wall is an elongated planar body having a top and bottom surface extending upward from the rear guide section by a bend in the roof guide.
4. The roof waste removal assembly of claim 3, wherein the front lip extends from the front wall and is bent about one hundred and eighty (180) degrees and is positioned on a bottom planar surface of the front wall.
5. The roof waste removal assembly of claim 4, wherein the rear guide section includes a floor, a guide threshold, and a rear lip.
6. The roof waste removal assembly of claim 5, wherein the floor is an elongated planar body having a top and bottom surface extending upward from the rear guide section by the bend in the roof guide.
7. The roof waste removal assembly of claim 6, wherein the guide threshold is an elongated planar body that extends from the floor and is angled with respect to the bottom surface of the floor.
8. The roof waste removal assembly of claim 7, wherein the rear lip extends from the guide threshold and is bent about one hundred and eighty (180) degrees and is positioned on a bottom planar surface of the guide threshold.
9. The roof waste removal assembly of claim 1, wherein the gutter shield is an elongated structured formed from a single piece of material and includes a front guard section and a rear guard section positioned orthogonal to the front guide section.
10. The roof waste removal assembly of claim 9, wherein the front guard section a rear wall and a front overlap section, the front guard section is an elongated planar body having a top and bottom surface extending downward from the rear guard section by a bend in the gutter shield.
11. The roof waste removal assembly of claim 10, wherein the rear guard section includes a cover section having an elongated planar body with a top and bottom surface extending away from the front guard section, a guard threshold that extends from the cover section and is angled with respect to the bottom surface of the cover section, and a rear overlap section that extends from the guard threshold and is bent about one hundred and eighty (180) degrees and is positioned on a bottom planar surface of the guard threshold.
12. The roof waste removal assembly of claim 1, further comprising an extender connecting to the self-propelled trailer and includes a pair of extension arms and a guard panel secured by the pair of extension arms.
13. The roof waste removal assembly of claim 12, wherein each extension arm of the pair of extension arms is a two piece construction having a front arm and a sliding support arm corresponding to the front arm.
14. The roof waste removal assembly of claim 13, wherein the front arm is an elongated structural beam having a sliding support arm receiving passageway opening from a lead end thereof and extending there through a body of first arm to receive the sliding support arm.
15. The roof waste removal assembly of claim 12, wherein the front arm includes a front panel catch positioned on a trailing end thereof, a middle panel catch positioned on a leading end thereof, and lock receiving passageway positioned at the leading end thereof and extending completely there through.
16. The roof waste removal assembly of claim 15, wherein the front panel catch is secured to an upper surface of the first arm and includes an arm mount section secured to the top surface of the first arm, a wall section extending orthogonal to the arm mount section, a support extending and connecting the arm mount section and the wall section, and a panel mount section extending orthogonal to the wall section and parallel to the arm mount section but extending in the opposite direction.
17. The roof waste removal assembly of claim 16, wherein the middle panel catch is secured to the upper surface of the first arm and includes an arm mount section secured to the top surface of the first arm, a first panel mount section extending orthogonal to the arm mount section, a wall section extending orthogonal to first panel mount section and parallel to the arm mount section, and a second panel mount section extending orthogonal to the wall section and parallel to the first panel mount section.

18. The roof waste removal assembly of claim 15, wherein the sliding support arm is an elongated structural beam and includes a rear panel catch positioned on a lead end thereof and a lock receiving passageway positioned at the leading end thereof and extending completely there through.

19. The roof waste removal assembly of claim 18, wherein the rear panel catch is secured to an upper surface of the sliding support arm and includes an arm mount section secured to an end surface of the sliding support arm and a panel mount section extending orthogonal to the arm mount section and parallel top surface of the sliding support arm.

20. The roof waste removal assembly of claim 12, wherein the guard panel is a rectangular planar member secured to the pair of extension arms.

21. The roof waste removal assembly of claim 1, wherein the extension device is an extender having a cover secured to a wind-up mechanism on the storage bin.

22. The roof waste removal assembly of claim 21, wherein the extender includes a cover guide with a guide bar positioned above the wind-up mechanism and secured to the storage bin.

23. The roof waste removal assembly of claim 22, wherein the cover includes an end connected to a roller bar of the wind-up mechanism and another end fed between the guide bar and the storage bin.

24. A roof waste removal assembly comprising:
a chute system having:
a roof guide; and
a gutter shield;
a self-propelled expanding trailer having:
a frame;
an extension device secured to the frame;
a storage bin secured to the extension device; and
an extender connecting to the self-propelled trailer and includes a pair of extension arms and a guard panel secured by the pair of extension arms, wherein each extension arm of the pair of extension arms is a two piece construction having a front arm and a sliding support arm corresponding to the front arm.

25. The roof waste removal assembly of claim 24, wherein the front arm is an elongated structural beam having a sliding support arm receiving passageway opening from a lead end thereof and extending there through a body of first arm to receive the sliding support arm.

26. The roof waste removal assembly of claim 24, wherein the front arm includes a front panel catch positioned on a trailing end thereof, a middle panel catch positioned on a leading end thereof, and lock receiving passageway positioned at the leading end thereof and extending completely there through.

27. The roof waste removal assembly of claim 26, wherein the front panel catch is secured to an upper surface of the first arm and includes an arm mount section secured to the top surface of the first arm, a wall section extending orthogonal to the arm mount section, a support extending and connecting the arm mount section and the wall section, and a panel mount section extending orthogonal to the wall section and parallel to the arm mount section but extending in the opposite direction.

28. The roof waste removal assembly of claim 27, wherein the middle panel catch is secured to the upper surface of the first arm and includes an arm mount section secured to the top surface of the first arm, a first panel mount section extending orthogonal to the arm mount section, a wall section extending orthogonal to first panel mount section and parallel to the arm mount section, and a second panel mount section extending orthogonal to the wall section and parallel to the first panel mount section.

29. The roof waste removal assembly of claim 26, wherein the sliding support arm is an elongated structural beam and includes a rear panel catch positioned on a lead end thereof and a lock receiving passageway positioned at the leading end thereof and extending completely there through.

30. The roof waste removal assembly of claim 29, wherein the rear panel catch is secured to an upper surface of the sliding support arm and includes an arm mount section secured to an end surface of the sliding support arm and a panel mount section extending orthogonal to the arm mount section and parallel top surface of the sliding support arm.

31. The roof waste removal assembly of claim 24, wherein the guard panel is a rectangular planar member secured to the pair of extension arms.

32. A roof waste removal assembly comprising:
a chute system having:
a roof guide; and
a gutter shield;
a self-propelled expanding trailer having:
a frame;
an extension device secured to the frame and is an extender having a cover secured to a wind-up mechanism on the storage bin; and
a storage bin secured to the extension device.

33. The roof waste removal assembly of claim 32, wherein the extender includes a cover guide with a guide bar positioned above the wind-up mechanism and secured to the storage bin.

34. The roof waste removal assembly of claim 33, wherein the cover includes an end connected to a roller bar of the wind-up mechanism and another end fed between the guide bar and the storage bin.

\* \* \* \* \*